US012597042B2

(12) United States Patent
Aurongzeb et al.

(10) Patent No.: US 12,597,042 B2
(45) Date of Patent: Apr. 7, 2026

(54) SYSTEM AND METHOD FOR LIMITING CARBON DIOXIDE FOOTPRINT CAUSED BY INSTALLATION OF SOFTWARE AND FIRMWARE UPDATES

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 925 days.

(21) Appl. No.: 17/874,238

(22) Filed: Jul. 26, 2022

(65) Prior Publication Data

US 2024/0037564 A1 Feb. 1, 2024

(51) Int. Cl.
| | |
|---|---|
| *G06Q 30/018* | (2023.01) |
| *G06F 8/61* | (2018.01) |
| *G06F 8/65* | (2018.01) |

(52) U.S. Cl.
CPC ............. *G06Q 30/018* (2013.01); *G06F 8/61* (2013.01); *G06F 8/65* (2013.01)

(58) Field of Classification Search
CPC ............ G06Q 30/018; G06F 8/61; G06F 8/65
See application file for complete search history.

(56) References Cited

U.S. PATENT DOCUMENTS

| | | | |
|---|---|---|---|
| 7,694,291 | B2 | 4/2010 | Chen |
| 8,595,234 | B2 | 11/2013 | Siripurapu |
| 8,626,450 | B2 | 1/2014 | Dooley |

(Continued)

FOREIGN PATENT DOCUMENTS

WO 2011/106160 A2 9/2011

OTHER PUBLICATIONS

C. Herrmann, et al., "Sustainability as Strategic Business Model for Profitable Business," 6 pages, May 2014.

(Continued)

*Primary Examiner* — Zhipeng Wang
(74) *Attorney, Agent, or Firm* — Prol Intellectual Property Law, PLLC; H. Kenneth Prol

(57) ABSTRACT

A system and a method for executing an update carbon dioxide (CO2) footprint optimization system for a client information handling system comprising a processor to gather telemetry describing power consumption and usage of hardware component resources during execution of a software application, to determine an execution CO2 emissions comparison index value describing a difference between CO2 emitted due to recent execution of the application relative to CO2 emitted due to the current execution at an optimal efficiency or due to a modelled, expected performance of the application after installation of an available update, and to determine an installation CO2 emissions comparison index value estimating CO2 emissions associated with an installation process of the available update. The system and method generating a user recommendation to delay installation of the update if the installation CO2 emissions comparison index value exceeds the execution CO2 emissions comparison index value to conserve CO2 emissions.

20 Claims, 6 Drawing Sheets

(56) References Cited

U.S. PATENT DOCUMENTS

| | | | |
|---|---|---|---|
| 8,904,374 B2 | 12/2014 | Nakamura | |
| 10,581,974 B2 | 3/2020 | Sustaeta | |
| 10,705,786 B2 | 7/2020 | Liu | |
| 10,938,954 B2 | 3/2021 | Lee | |
| 10,977,293 B2 | 4/2021 | Cai | |
| 2009/0292617 A1 | 11/2009 | Sperling | |
| 2010/0070404 A1 | 3/2010 | McConnell | |
| 2014/0100937 A1 | 4/2014 | Na | |
| 2014/0316964 A1 | 10/2014 | Slutsker | |
| 2014/0325481 A1* | 10/2014 | Pillai | G06F 11/3003 |
| | | | 717/124 |
| 2019/0349321 A1 | 11/2019 | Cai | |
| 2022/0011843 A1* | 1/2022 | MacNamara | G06F 11/3062 |
| 2023/0245009 A1* | 8/2023 | Roy | G06F 1/3206 |
| | | | 705/7.12 |
| 2023/0273783 A1* | 8/2023 | Molander | G06F 8/61 |
| | | | 717/168 |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

*FIG. 3*

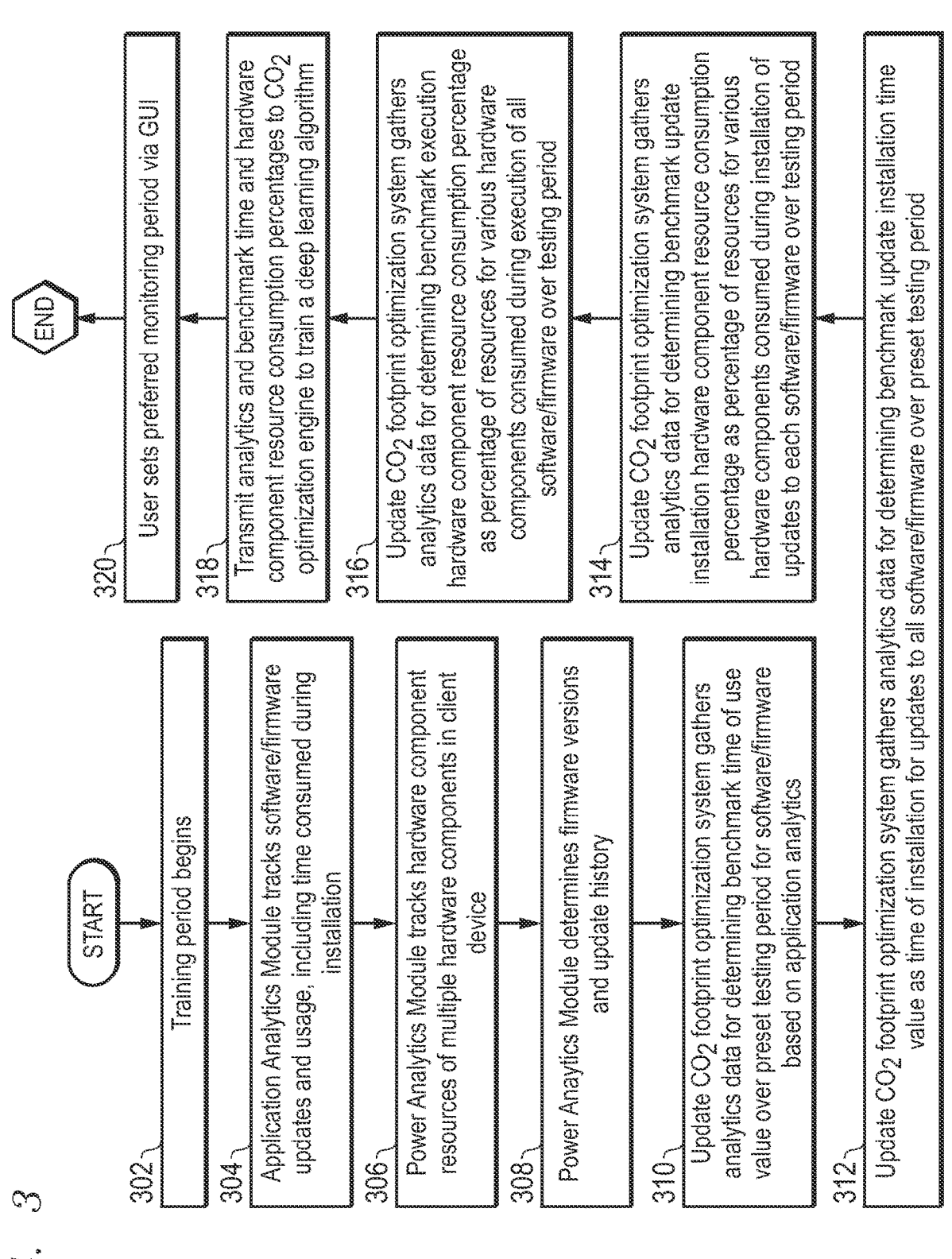

302 — Training period begins

304 — Application Analytics Module tracks software/firmware updates and usage, including time consumed during installation 306 — Power Analytics Module tracks hardware component resources of multiple hardware components in client device 308 — Power Analytics Module determines firmware versions and update history 310 — Update $CO_2$ footprint optimization system gathers analytics data for determining benchmark time of use value over preset testing period for software/firmware based on application analytics 312 — Update $CO_2$ footprint optimization system gathers analytics data for determining benchmark update installation time value as time of installation for updates to all software/firmware over preset testing period 314 — Update $CO_2$ footprint optimization system gathers analytics data for determining benchmark update installation hardware component resource consumption percentage as percentage of resources for various hardware components consumed during installation of updates to each software/firmware over testing period 316 — Update $CO_2$ footprint optimization system gathers analytics data for determining benchmark execution hardware component resource consumption percentage as percentage of resources for various hardware components consumed during execution of all software/firmware over testing period 318 — Transmit analytics and benchmark time and hardware component resource consumption percentages to $CO_2$ optimization engine to train a deep learning algorithm 320 — User sets preferred monitoring period via GUI

*FIG. 4*

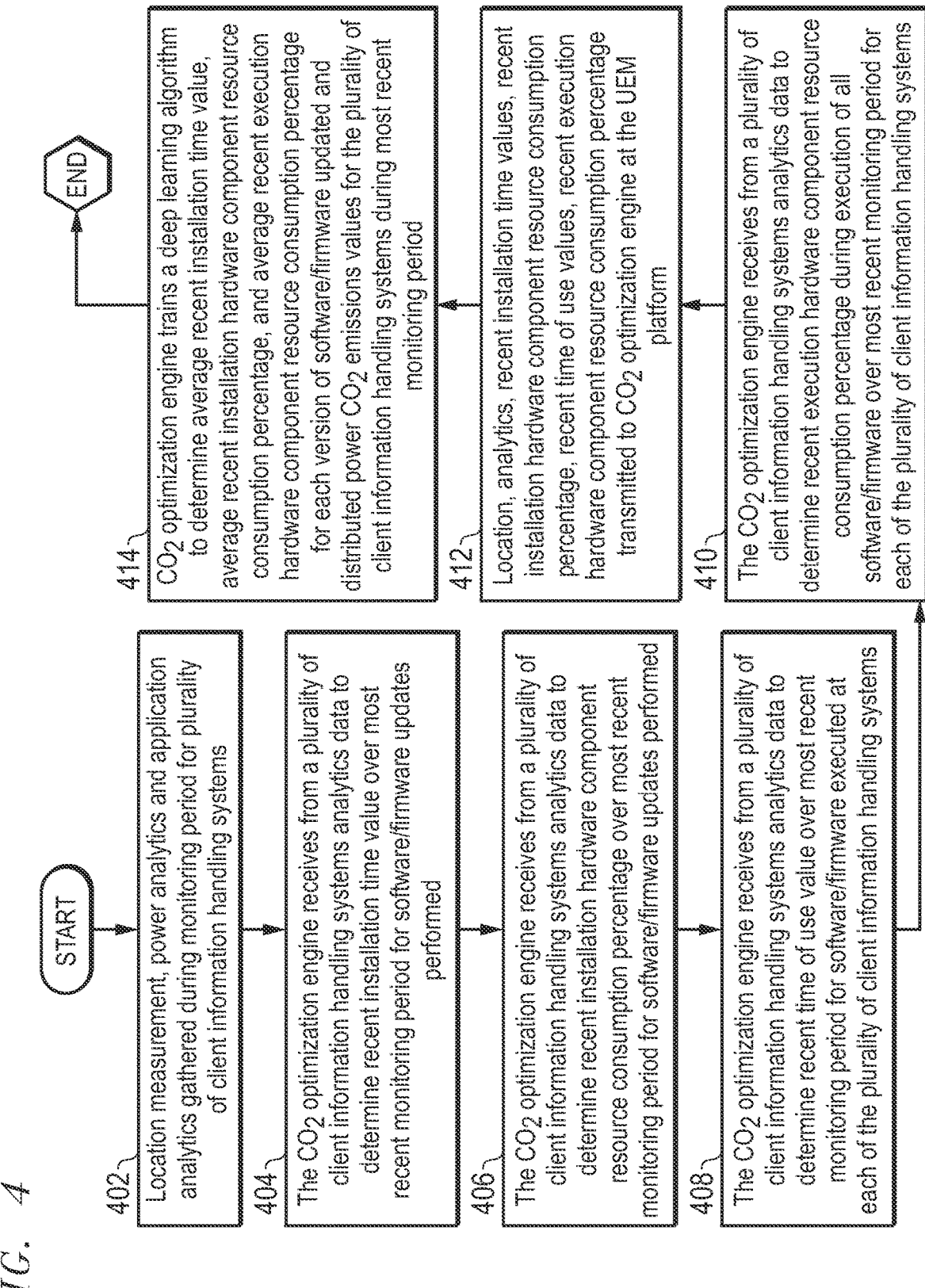

START

402 — Location measurement, power analytics and application analytics gathered during monitoring period for plurality of client information handling systems 404 — The $CO_2$ optimization engine receives from a plurality of client information handling systems analytics data to determine recent installation time value over most recent monitoring period for software/firmware updates performed 406 — The $CO_2$ optimization engine receives from a plurality of client information handling systems analytics data to determine recent installation hardware component resource consumption percentage over most recent monitoring period for software/firmware updates performed 408 — The $CO_2$ optimization engine receives from a plurality of client information handling systems analytics data to determine recent time of use value over most recent monitoring period for software/firmware executed at each of the plurality of client information handling systems 410 — The $CO_2$ optimization engine receives from a plurality of client information handling systems analytics data to determine recent execution hardware component resource consumption percentage during execution of all software/firmware over most recent monitoring period for each of the plurality of client information handling systems 412 — Location, analytics, recent installation time values, recent installation hardware component resource consumption percentage, recent time of use values, recent execution hardware component resource consumption percentage transmitted to $CO_2$ optimization engine at the UEM platform 414 — $CO_2$ optimization engine trains a deep learning algorithm to determine average recent installation time value, average recent installation hardware component resource consumption percentage, and average recent execution hardware component resource consumption percentage for each version of software/firmware updated and distributed power $CO_2$ emissions values for the plurality of client information handling systems during most recent monitoring period

END

*FIG. 5A*

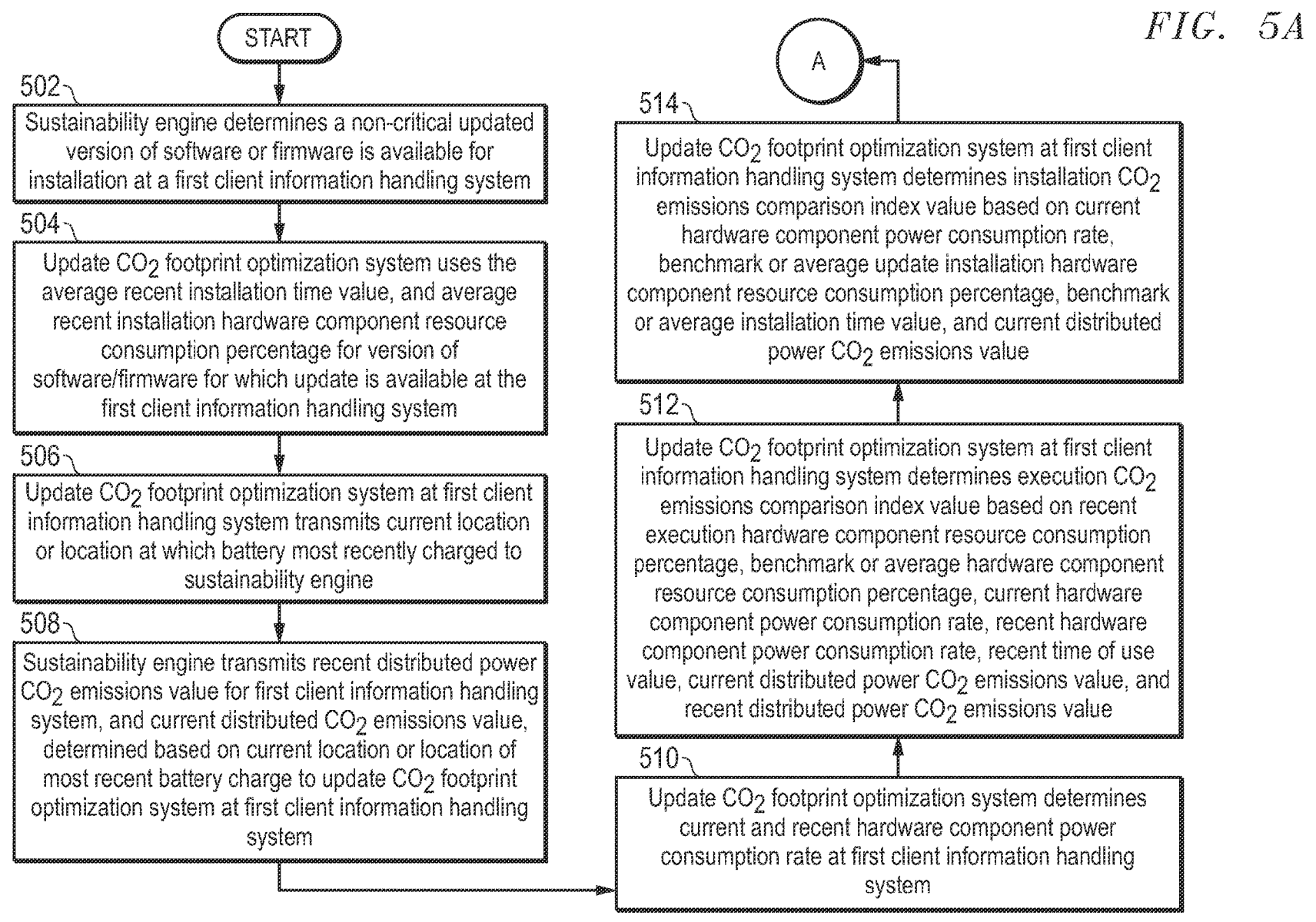

START

502 — Sustainability engine determines a non-critical updated version of software or firmware is available for installation at a first client information handling system 504 — Update $CO_2$ footprint optimization system uses the average recent installation time value, and average recent installation hardware component resource consumption percentage for version of software/firmware for which update is available at the first client information handling system 506 — Update $CO_2$ footprint optimization system at first client information handling system transmits current location or location at which battery most recently charged to sustainability engine 508 — Sustainability engine transmits recent distributed power $CO_2$ emissions value for first client information handling system, and current distributed $CO_2$ emissions value, determined based on current location or location of most recent battery charge to update $CO_2$ footprint optimization system at first client information handling system 510 — Update $CO_2$ footprint optimization system determines current and recent hardware component power consumption rate at first client information handling system 512 — Update $CO_2$ footprint optimization system at first client information handling system determines execution $CO_2$ emissions comparison index value based on recent execution hardware component resource consumption percentage, benchmark or average hardware component resource consumption percentage, current hardware component power consumption rate, recent hardware component power consumption rate, recent time of use value, current distributed power $CO_2$ emissions value, and recent distributed power $CO_2$ emissions value 514 — Update $CO_2$ footprint optimization system at first client information handling system determines installation $CO_2$ emissions comparison index value based on current hardware component power consumption rate, benchmark or average update installation hardware component resource consumption percentage, benchmark or average installation time value, and current distributed power $CO_2$ emissions value

A

SYSTEM AND METHOD FOR LIMITING CARBON DIOXIDE FOOTPRINT CAUSED BY INSTALLATION OF SOFTWARE AND FIRMWARE UPDATES

FIELD OF THE DISCLOSURE

The present disclosure generally relates to determining an amount of greenhouse gas emissions that may be attributable to usage at an information handling system of software applications and power. More specifically, the present disclosure relates to an update $CO_2$ footprint optimization system for optimizing installation of available firmware or software application updates to minimize $CO_2$ emissions associated with execution and updating of those firmware or software applications.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a flow diagram illustrating a method of training to determine benchmark values for firmware and software applications during a testing period according to an embodiment of the present disclosure;

FIG. 4 is a flow diagram illustrating a method of recording recent values for firmware and software during a recent monitoring period of a plurality of information handling systems according to an embodiment of the present disclosure;

FIG. 5A is a flow diagram illustrating determining $CO_2$ estimated to be emitted during updating and execution of software applications or firmware drivers according to an embodiment of the present disclosure.

The use of the same reference symbols in different drawings may indicate similar or identical items.

DETAILED DESCRIPTION OF THE DRAWINGS

Figure 1:
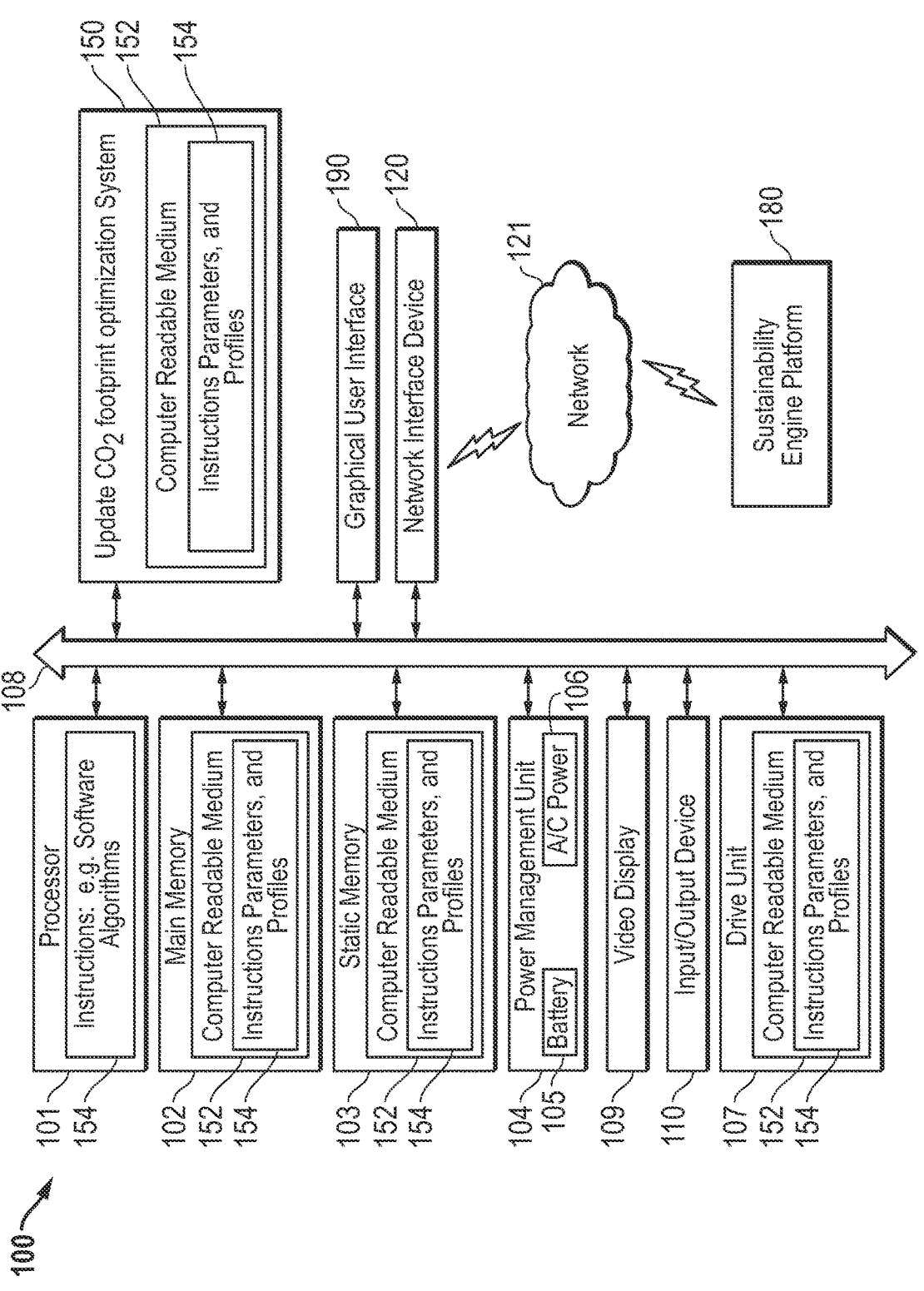
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is the use of software applications and consumption of power at end devices such as information handling systems operated by an end user. Execution and updating of firmware and software applications at client information handling systems may involve usage of resources for hardware components. As such resource usage increases, based on firmware and software application initiation or execution, the power drawn by those hardware components and resulting carbon footprint for the client information handling system may also increase. Thus, the usage of hardware resources during initiation or execution of any given firmware or software application may directly impact the power consumed and GHGs emitted by the client information handling system. In some embodiments, initiated software may not even be used, may be redundant, or may be seldom used.

Client information handling systems routinely automatically update firmware or software applications, as they become available. Some updates may increase the efficiency of hardware (e.g., through firmware or driver updates), or may increase the efficiency with which software applications consume hardware component resources (e.g., make calls to the CPU, store data in memory). These updates may significantly decrease an overall power consumption and resulting carbon footprint for a client information handling system, especially if the firmware or software application to be updated is routinely executed by the user. However, in other cases, such firmware or software application that are to be updated may be executed rarely or never. Additionally, some updates to firmware or software applications may not increase the efficiency of power consumption at the client information handling system. Further, the installation of the update consumes hardware component resources, and thus, by itself, increases power consumption and carbon footprint for the client information handling system. Rather than automatically updating firmware or software applications as the updates become available, a system is needed to only install updates projected to cause a net decrease in power consumption (e.g., including consideration of the power consumed during the update installation), to optimize $CO_2$ footprints for firmware and software application updates.

The update $CO_2$ footprint optimization system in embodiments of the present disclosure addresses this issue by determining, based on telemetry gathered during a testing period of the client information handling system and previous monitoring periods of the client information handling system or a plurality of other information handling systems, whether an update will result in a net decrease of power consumption. Benchmark values for power consumption during execution of a firmware or software application in a training period (e.g., 6 months) following initial installation of the firmware or software application (e.g., immediately following purchase or refurbishment of the client information handling system) may provide a measure of how much power the firmware or software application should consume when operating efficiently (e.g., when fully updated). Such data may be input into a deep learning algorithm system at a $CO_2$ optimization engine at a unified endpoint management (UEM) platform to train the deep learning algorithm on the benchmark values the methods described herein in an embodiment. Time and power consumed during installation of a previous update to the firmware or software application may also be measured as a benchmark either during the testing period at the first client information handling system, or during installation at other client information handling systems.

In embodiments described herein, the update $CO_2$ footprint optimization system may routinely monitor power consumption, updates, and execution of such a firmware or software application during later monitoring periods, following the testing period. During such a monitoring period, a power analytics module and an application analytics module may gather performance data necessary to determine the amount of power consumed by one or more specific hardware components, or by the client information handling system as a whole, due to execution of the firmware or software application, or due to installation of updates to the firmware or software application. The update $CO_2$ footprint optimization engine agent at the client information handling system may receive a trained deep learning algorithm system at the update $CO_2$ optimization system to assess current power usage and operation as well as available updates for the client information handling system. The update $CO_2$ footprint optimization system may estimate how much power consumption may be decreased by installing an available update for the firmware or software application based on the difference between the benchmark measure of power consumed during execution of the firmware or software application and the current power consumption during such execution. In addition, the update $CO_2$ footprint optimization system may estimate how much power will be consumed during installation of the update based on the power consumed during previous installation of prior updates to the same firmware or software application, or upon time of installation of the current update at other client information handling systems. The update $CO_2$ footprint optimization system in embodiments may recommend declining the update to the firmware or software application when the estimated power that will be consumed during the update exceeds the estimated decrease in power consumption that the update will afford. The update $CO_2$ optimization system in other embodiments may also recommend declining updates to the firmware or hardware if that firmware or hardware is determined to not be used or seldom used in various embodiments herein. In such a way, the update $CO_2$ footprint optimization system may optimize the update process for various firmware or software applications based on actual usage and power consumption statistics to decrease the carbon footprint caused by updating and execution of those firmware or software applications.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 154 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a network interface device 120, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C)

power adapter 106 may supply power to one or more components of the information handling system 100, including the processor 101 executing instructions of a client device update carbon dioxide (CO2) footprint optimization system 150, the wireless network interface device 120, a static memory 103 or drive unit 107, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 154, such as for the client device update CO2 footprint optimization system 150 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 154 storing instructions 154. In some embodiments, information handling system 100, or portions thereof, may represent a client information handling system 100 operating various hardware components (e.g., processor 101, memory 102, network interface device 120, power management unit 104) during execution of various software applications, operating system (OS) software, application software, BIOS software, or other software applications or drivers detectable by processor type 101, and executing an the client device update CO2 footprint optimization system 150, as described in greater detail below with respect to FIG. 2. In other embodiments the information handling system 100 may represent a server information handling system of a remote Unified Endpoint Management (UEM) platform 180 in communication with the client information handling system 100 via the network 121.

The disk drive unit 107 and static memory 103 may also contain space for data storage in a computer readable medium 154. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 120 may provide connectivity of the information handling system 100 to the network

121 via a dedicated link, a network AP or base station in an embodiment. The network 121 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 121 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 121, one or more APs for those networks, or to a docking station in an embodiment may be via wired or wireless connection. In some aspects of the present disclosure, the network interface device 120 may operate two or more wireless links. In other aspects of the present disclosure, the information handling system 100 may include a plurality of network interface devices, each capable of establishing a separate wireless link to network 121, such that the information handling system 100 may be in communication with network 121 via a plurality of wireless links.

The network interface device 120 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 120, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 120 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 121 may communicate voice, video or data over the network 121. Further, the instructions 154 may be transmitted or received over the network 121 via the network interface device 120. The information handling system 100 may include a set of instructions 154 that may be executed to cause the computer system to perform any one or more of the methods or computer-based functions disclosed herein, such as recommending a user decline an update to the firmware or software application when the estimated power that will be consumed during the update exceeds the estimated decrease in power consumption that the update will afford or when the firmware or software application is never used or seldom executed in various embodiments. For example, instructions 154 may include a particular example of a client device update CO2 footprint optimization system 150, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

The client device update CO2 footprint optimization system 150 may utilize a computer-readable medium 154 in which one or more sets of instructions 154 may operate in part as software or firmware instructions executed on the information handling system 100. The instructions 154 may embody one or more of the methods or logic as described herein. For example, instructions relating to the client device update CO2 footprint optimization system 150, firmware or software algorithms, processes, and/or methods may be stored here. Such instructions 154 may comprise determining an amount of greenhouse gas emissions that may be attributable to usage at an information handling system of software applications and power, tracking such greenhouse gas emissions over time, and making recommendations for application usage that may reduce such emissions. The client device update CO2 footprint optimization system 150 may operate at a client information handling system 100 in communication with a Unified Endpoint Management (UEM) platform 180 that gathers telemetries from a plurality of client information handling systems (e.g., including 100)

via the network 121 that describe operating environments for those client information handling systems (e.g., 100). The UEM platform 180 in an embodiment may operate to identify information technology (IT) issues at client information handling systems (e.g., 100), and to provide support for such issues, including automatically updating drivers or hardware components, as needed. The UEM platform 180 in an embodiment may operate as a cloud-based service to store data (e.g., operating environment telemetries for remote client information handling systems) within memory 102, static memory 103, or computer readable medium 154 received via network 121. In some embodiments the information handling system 100 may be a server executing a UEM platform 180. In other embodiments, the information handling system 100 may depict a client information handling system that reports to a UEM 180 and receives information about other client information handling systems from the UEM 180 pursuant to various embodiments described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the client device update CO2 footprint optimization system 150 may be stored in static memory 103, or the drive unit 107 on a computer-readable medium 154 such as a flash memory or magnetic disk in an example embodiment. More specifically, telemetries describing updating and executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
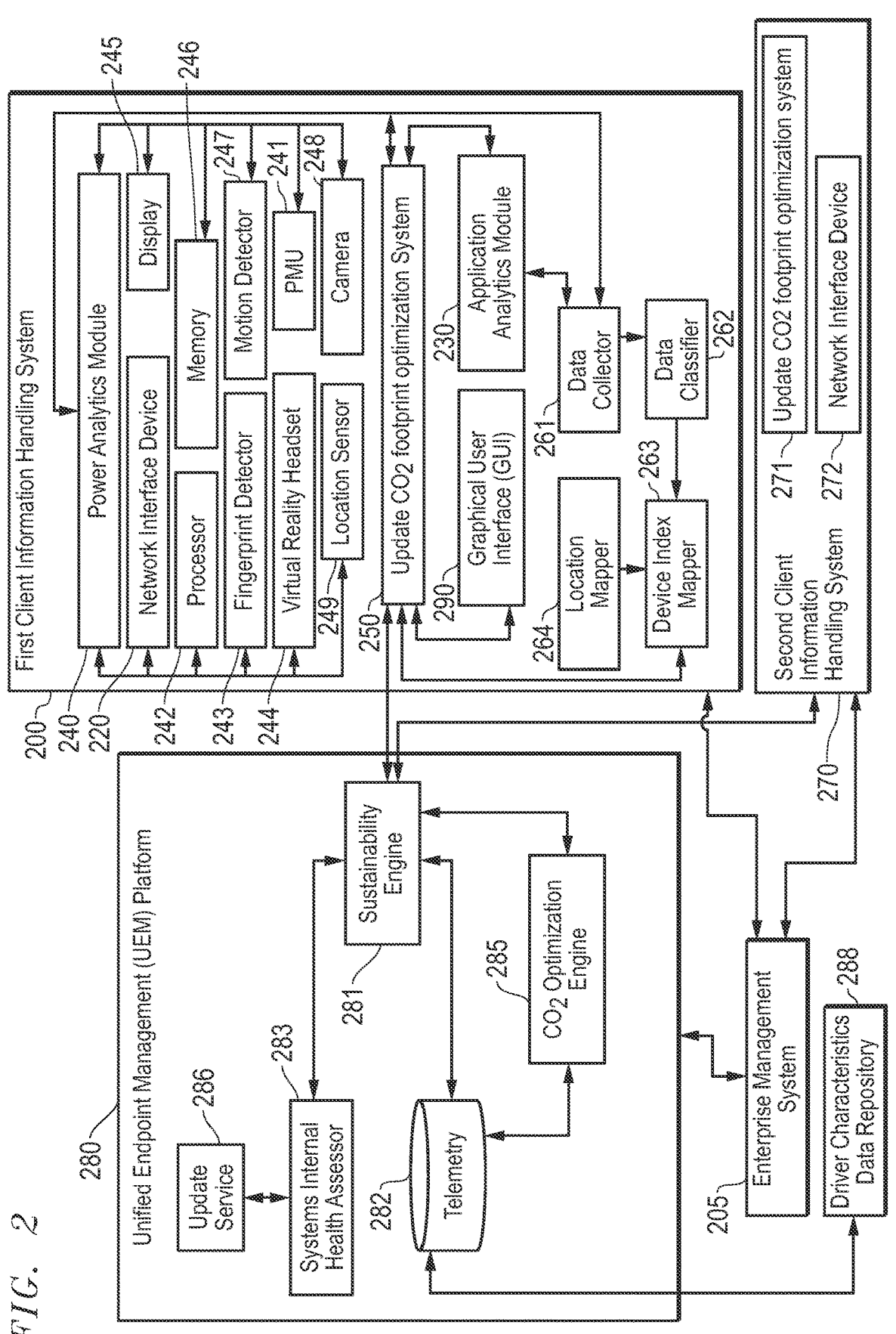
FIG. 2 is a block diagram illustrating a client device update $CO_2$ footprint optimization system of a client information handling system according to an embodiment of the present disclosure.

FIG. 2 is a block diagram illustrating a client device update CO2 footprint optimization system of a client information handling system communicating CO2 emissions associated with application and power usage at the client information handling system to a sustainability engine according to an embodiment of the present disclosure. A first client information handling system 200 in an embodiment may execute a client device update CO2 footprint optimization system 280 under management of or in communication with an enterprise management system 205, which may act as an interface between a plurality of client information handling systems (e.g., 200 or 270) and a unified endpoint management (UEM) platform 280. The UEM platform 280 and enterprise management system 205 in an embodiment may operate as a cloud-based service in communication with the enterprise management system 205 via a network to identify information technology (IT) issues at a first client information handling system 200, or a second client information handling system 270. The UEM platform 280 may also provide support for such issues, including working with the update service 286 to automatically update software applications or firmware drivers for hardware components, as needed, or as accepted by a user of the client information handling system 200. In a specific embodiment of the present disclosure, the UEM platform 280 may gather telemetries from a plurality of client information handling systems (e.g., 200 and 270) that describe operating environments for those client information handling systems (e.g., power usage by a plurality of hardware components, or analytics for software usage and updating).

A client device update CO2 footprint optimization system 250 operating at the UEM platform 280 in an embodiment may determine an amount of greenhouse gas (GHG) emissions that may be attributable to power consumption due to usage at an information handling system of firmware and software applications, and to updating of such firmware and software applications. The update CO2 footprint optimization system 250 in an embodiment may further generate recommendations to decline automatic or suggested updates to firmware or software when the update is estimated to result in more power consumption than it will save (e.g., by making the firmware or software operate more efficiently). Additionally, the update CO2 optimization system may recommend to decline updates when firmware or a software application for which a potential update is available is never used or is seldom used in some embodiments. This tracking and generation of recommendations may be made based upon telemetry data gathered from a pool of information handling systems including 200 and 270, and others in various embodiments. The UEM platform 280 may receive such telemetries from a plurality of client information handling systems (e.g., 200 and 270), which may be managed by the same enterprise management system (e.g., 205), or may be managed by separate enterprise management systems in various embodiments.

Each client information handling system (e.g., 200 or 270) in an embodiment may include a plurality of hardware components. For example, a first client information handling system 200 in an embodiment may include a network interface device 220, a processor (e.g., central processing unit (CPU), graphics processing unit (GPU), or visual processing unit (VPU)) 242, a display 245, and a memory 246, and one or more components of a power supply unit 241 (e.g., battery). In some embodiments, the first client information handling system 200 may further include one or more sensing devices, such as a fingerprint detector 243, a motion detector 247, a camera 248, or location sensing devices 249 (e.g., GPS location unit). In still other embodiments, the first client information handling system 200 may include one or more peripheral devices, such as the virtual reality headset 244.

A power analytics module 240 in an embodiment may be in communication with various hardware components (e.g., 220, 241, 242, 243, 244, 245, 246, 247, 248, or 249) and firmware for those components in an embodiment. For example, the power analytics module 240 may monitor power consumption by each of the various hardware components (e.g., 220, 241, 242, 243, 244, 245, 246, 247, 248, or 249) in an embodiment. In another example embodiment, the power analytics module 240 may also access firmware for hardware components (e.g., 220, 241, 242, 243, 244, 245, 246, 247, 248, or 249) to determine policies or settings for those components at the time of such power measurements.

More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, and time required to process requests to access such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution).

In another example, the power analytics module 240 in an embodiment may determine current usage of network interface device resources by software applications as a percentage of total capacity for the network interface device 220 to transceive data (e.g., percentage of total available throughput used). In yet another example, the power analytics module 240 in an embodiment may determine current usage of the camera 248 resources by software applications as a percentage of total capacity for image capture by the camera 248. In still another example embodiment, the power analytics module 240 may determine policies controlling the periods in which sensing hardware may be operational. More specifically, the power analytics module 240 in an embodiment may determine whether the motion detector 247, or location sensing device (e.g., GPS unit) 249 are set to remain on at all times, to operate only when a laptop or mobile information handling system is in a certain position (e.g., closed or open), to operate when a mobile device is currently moving, or to operate only when a user is actively executing software applications or certain software applications. All information accessed in such a way by the power analytics module 240 in an embodiment may be communicated to the update CO2 footprint optimization system 250.

In an embodiment, the power analytics module 240 may also be capable of determining the current versions of drivers for various hardware components (e.g., 220, 241, 242, 243, 244, 245, 246, 247, 248, or 249). In some embodiments, the power analytics module 240 may also track power consumed during installation or updating of such drivers. For example, the power analytics module 240 may identify download, storage, and time of execution data for each installation file (e.g., files having the extension ".sys"). In still other embodiments, the power analytics module 240 may further determine power consumed during updates made to various software applications executing via the processor 242 (e.g., CPU, GPU, or VPU). For example, the power analytics module 240 may identify download, storage, and time of execution data for each installation file (e.g., files having the extension ".ini"). The power analytics module 240 may track usage of various hardware components by each executed process (e.g., execution of ".ini" or ".sys" files) during installation of drivers or software applications. In some embodiments, the power analytics module 240 may receive updated drivers, or direct installation of those drivers, based on recommendations approved by the user of the client information handling system 200, as made by the update CO2 footprint optimization system. For example, the update CO2 footprint optimization system in an embodiment, as described herein, may recommend that a user decline to update firmware or software when performing the update is estimated to consume more power than it will save by causing the firmware or software to perform more efficiently or if the firmware or software application is never used or seldom executed.

As described above, the power analytics module 240 may be in communication with a client device update CO2 footprint optimization system 250, which may also be in communication with an application analytics module 230. In an embodiment, the application analytics module 230 may monitor and adjust execution of software applications within the operating system (OS) for the first client information handling system 200. The application analytics module 230 in an embodiment may further track which software applications are running or idle (e.g., executing in the background) at various times, and track current versions of software applications and times at which updates to such software applications are performed. As described herein, software applications may be associated with indirect emission of GHGs, such as CO2, based on usage of processing, memory, networking, and display resources.

As described herein, the client device update CO2 footprint optimization system 250 in an embodiment may gather data regarding hardware configuration and power consumption from the power analytics module 240 and data regarding software performance and processor/memory usage from the application analytics module 230 during routine monitoring periods, and during a testing period. For example, the update CO2 footprint optimization system 250 may gather such data during a testing period, beginning upon initial usage of the first client information handling system 200 by the user, and extending for some preset time period (e.g., six months). Data gathered or determined during such a testing period may be used to train for a benchmark estimation of power consumed and consequently CO2 emitted during execution of a software application or firmware driver operating at optimal efficiency. These values gathered may be used to train the deep learning algorithmic system at a remotely located CO2 optimization engine 285 in some embodiments. A trained deep learning algorithm may be transmitted and injected into the update CO2 footprint optimization system at a client information handling system 200 to utilize these benchmarks to generate recommendations relating to implementing updates or other factors to reduce CO2 emissions at the client information handling system 200.

In example embodiments, the deep learning algorithmic system or algorithm may be trained at the remotely located CO2 optimization engine 285 and may utilize any known or future developed type of machine learning or neural network. In particular embodiments, the machine learning could be selected from bootstrap aggregating ("bagging"), Bayes optimal classifier, boosting meta-algorithm, Bayesian model averaging, Bayesian model combination, and stacking generalization, for example. This deep learning algorithm may have training updates. A trained deep learning algorithm may be transmitted to and deployed at the update CO2 footprint optimization system 250 at any client information handling system and used to determine recommendation about executing updates, for example, to firmware or software applications in view of CO2 generation according to the embodiments herein.

The above benchmark values may represent an optimal execution baseline in an embodiment in that execution of such applications or drivers shortly after initial installation or purchase of a client information handling system (e.g., during a training period) may represent a highest performance efficiency that can reasonably be expected. In other words, as the client information handling system ages, the performance and efficiency of both hardware components and software applications or firmware drivers is expected to decline over time. In order to gauge such a decline and to ameliorate this decline while minimizing the impact on the environment, the update CO2 footprint optimization system 250 in an embodiment may consistently monitor data similar to that gathered or determined during the training period to continue to train the deep learning algorithm. This later analytics data gathering and determinations made based thereon may occur in routine monitoring periods following the training period. Thus, determinations made by the update CO2 footprint optimization system 250 in an embodiment, as described below, may be performed during the training period, based on analytics gathered during the training period, and may be performed during later monitoring periods, based on analytics gathered across a plurality of client information handling systems during these later monitoring periods.

The client device update CO2 footprint optimization system 250 in an embodiment may train the deep learning algorithmic system of the CO2 optimization engine 285 to determine benchmark time of use values for various hardware components (e.g., 220, 241, 242, 243, 244, 245, 246, 247, 248, or 249) due to firmware or software application execution for a testing period (e.g., as described in greater detail below with respect to FIG. 3), or for one or more monitoring periods (e.g., as described in greater detail below with respect to FIG. 4). For example, the update CO2 footprint optimization system 250 in an embodiment may determine, for each firmware or software application, a benchmark time of use value as a duration of time in which the firmware or software was being executed via a processor (and potentially consuming resources of other hardware components) at the client information handling system 200. Time of use of firmware or a software application may directly impact need for future updates in an embodiment. For example, firmware or software applications that are rarely or never used may not need to be updated since such updates will not increase efficiency of power usage during execution of those applications. In fact, such updates will unnecessarily consume power during the update process, but no gains in power consumption will be realized since the application or firmware is rarely or never used.

The client device update CO2 footprint optimization system 250 in an embodiment may train the deep learning algorithmic system of the CO2 optimization engine 285 to determine benchmark execution hardware component resource consumption percentages for various hardware components (e.g., 220, 241, 242, 243, 244, 245, 246, 247, 248, or 249) due to firmware or software application execution for a testing period (e.g., as described in greater detail below with respect to FIG. 3), or for one or more monitoring periods (e.g., as described in greater detail below with respect to FIG. 4). For example, the update CO2 footprint optimization system 250 in an embodiment may determine, for each firmware or software application, a percentage of resources for various hardware components (e.g., 220, 241, 242, 243, 244, 245, 246, 247, 248, or 249) that are being consumed during execution of such firmware or software. More specifically, a gaming software application in an embodiment may consume 90% of GPU resources, 90% of display resources, 25% of network interface device resources, and 10% of memory resources. A benchmark execution hardware component resource consumption percentage for execution of the same software application or firmware driver in an embodiment may also be recorded at other client information handling systems (e.g., 270). In some embodiments, such crowd-sourced benchmark execution hardware component resource consumption percentages from other client information handling systems (e.g., including 270) may be averaged across all devices to generate an average execution hardware component resource consumption percentage.

The client device update CO2 footprint optimization system 250 in an embodiment may train the deep learning algorithmic system of the CO2 optimization engine 285 to determine benchmark installation time values for various hardware components (e.g., 220, 241, 242, 243, 244, 245, 246, 247, 248, or 249) due to installation of updates for firmware or software application during a testing period (e.g., as described in greater detail below with respect to FIG. 3), or for one or more monitoring periods (e.g., as described in greater detail below with respect to FIG. 4). As another example, the update CO2 footprint optimization system 250 in an embodiment may determine, for each firmware or software application, a benchmark update installation time value as a duration of time consumed during installation of one or more updates for each specific firmware or software application the client information handling system 200. As described herein, the power analytics module 240 may identify download, storage, and time of execution data for each installation file (e.g., files having the extension ".ini"). A benchmark update installation time value for an update may also be recorded at other client information handling systems (e.g., 270). In some embodiments, such crowd-sourced benchmark update installation time values from other client information handling systems (e.g., including 270) may be averaged across all devices to generate an average update installation time value. These benchmark update installation time values may assist in estimating an amount of power that may be consumed by future updates at the same (e.g., 200) or different client information handling system (e.g., 270).

The client device update CO2 footprint optimization system 250 in an embodiment may train the deep learning algorithmic system of the CO2 optimization engine 285 to determine benchmark installation hardware component resource consumption percentages for various hardware components (e.g., 220, 241, 242, 243, 244, 245, 246, 247, 248, or 249) due to installation of updates for firmware or software application during a testing period (e.g., as described in greater detail below with respect to FIG. 3), or for one or more monitoring periods (e.g., as described in greater detail below with respect to FIG. 4). For example, the update CO2 footprint optimization system 250 in an embodiment may determine, for each firmware or software application, a percentage of resources for various hardware components (e.g., 220, 241, 242, 243, 244, 245, 246, 247, 248, or 249) that are being consumed during updating of such firmware or software. A benchmark installation hardware component resource consumption percentage for an update may also be recorded at other client information handling systems (e.g., 270). In some embodiments, such crowd-sourced benchmark installation hardware component resource consumption percentages from other client information handling systems (e.g., including 270) may be averaged across all devices to generate an average installation hardware component resource consumption percentage.

Following the training period and each monitoring period in an embodiment, a plurality of client information handling systems (e.g., 200 and 270) may transmit to the sustainability engine 281 the current location at which it is drawing alternating current (A/C) power via a wall socket, or the location at which the battery was most recently charged if the first client information handling system is currently operating on battery power. In order to make a determination as to whether to delay installation of an available update, the update CO2 footprint optimization system 250 in an embodiment may first estimate CO2 that would be emitted during installation of the update and a degree to which CO2 emissions may be decreased by such an installation (e.g., due to increased efficiency of the software application or firmware driver). Variables upon which such estimates may depend may include an estimate of CO2 that would be emitted due to power consumption of various hardware components pursuant to installation of the available update or execution of the software application or firmware driver both before and after such an update. Any estimates of CO2 emissions made based on consumption of power by various hardware components in an embodiment may depend upon the geographic location of the information handling system 200. As described herein, the CO2 emitted due to power consumption of various hardware components varies based on the CO2 emitted per Watt (or kW) by the supplier of that power. For example, some power plants use clean power sources such as hydro-electric power, wind power, or solar power. Other power plants may generate power primarily through the burning of fossil fuels (e.g., liquid natural gas, petroleum, coal), which may be associated with much higher CO2 emissions than cleaner power sources. Thus, the geographic location of the client information handling system 200, and consequently the power plant or other source of power that is supplying power consumed by the client information handling system 200 may impact any estimate of CO2 emissions due to power consumption.

The update CO2 footprint optimization systems (e.g., 250 and 271) in an embodiment may also transmit power and application analytics, time of use values, installation time values, and hardware component resource consumption percentages to the sustainability engine 281, following the training period and each monitoring period in an embodiment. For example, the client device update CO2 footprint optimization system 250 may gather the information received from the power analytics module 240 and the application analytics module 230 and any determined benchmark values into a telemetry for the training period or a monitoring period used for additional training and transmit that telemetry to the UEM platform 280. An update CO2 footprint optimization system 271 operating at a second client information handling system 270 may also transmit similar telemetries, indicating software application usage and power usage at the second information handling system 270.

The UEM platform 280 in an embodiment may include a sustainability engine 281, telemetry storage 282, a CO2 optimization engine 285, and an update service 286. The sustainability engine 281 in an embodiment may operate to routinely gather telemetries from update CO2 footprint optimization systems (e.g., 250 and 271) operating at a plurality of information handling systems (e.g., 200, and 270, respectively). Each telemetry thus received in an embodiment may be stored in telemetry 282 for later training analysis or for use by the client device update CO2 footprint optimization system 280. The CO2 optimization engine 285 in an embodiment may also store information such as known statistics for GHG emissions due to power consumption in the measured location of a client information handling system (e.g., 200). Upon receipt of the telemetry identifying the location of the first client information handling system 200 in an embodiment, the sustainability engine 281 may retrieve a distributed power CO2 emissions value for the geographic location of the first client information handling system during the current monitoring period from the CO2 optimization engine 285. In some embodiments in which the first client information handling system 200 is operating on battery power during some or all of a given monitoring period, the sustainability engine 281 may retrieve a distributed power CO2 emissions value for the geographic location in which the first client information handling system charged the battery most recently, which may have occurred partially or wholly outside of the current monitoring period. Such a distributed power CO2 emissions value may describe the amount of GHG emitted during the generation of a single unit of power (e.g., one kWh) by a power plant known to supply power within the geographic region including the location of the first information handling system 200. The sustainability engine 281 in an embodiment may transmit this distributed power CO2 emissions value for the geographic location of the first information handling system 200 to the client device update CO2 footprint optimization system 250.

The CO2 optimization engine 285 or the sustainability engine 281 in an embodiment may also determine an average recent installation time value and an average recent installation hardware component resource consumption percentage determined across a plurality of client information handling systems (e.g., including 270) performing an installation of the same update to the same software application or firmware driver. This average recent installation time value and average recent installation hardware component resource consumption percentage may be determined by taking an average of values received during one or more recent monitoring periods as recorded by a plurality of client information handling systems (e.g., including 270). As described herein, these values may be useful in estimating the power that may be consumed, and thus CO2 that may be emitted during installation of the same update at another client information handling system (e.g., 200).

In an embodiment, the CO2 optimization engine 285 or the sustainability engine 281 may also determine an average recent execution hardware component resource consumption percentage across a plurality of client information handling systems (e.g., including 270) executing the software application or firmware driver following installation of the update that is currently available for installation at another client information handling system (e.g., 200). This average recent execution hardware component resource consumption percentage may be determined by taking an average of values received during one or more recent monitoring periods as recorded by a plurality of client information handling systems (e.g., including 270). As described herein, these values may be useful in estimating the power that may be consumed, and thus CO2 that may be emitted during execution of the software application or firmware driver following installation of the available update at another client information handling system (e.g., 200).

As described herein, the UEM platform 280 may control updating of drivers or hardware components, as needed, or as accepted by a user of the client information handling system 200. For example, the UEM platform 280 in an embodiment may work with the update service 285 to determine that an update is available to a software application or firmware driver operating at the first client information handling system 200. The update service 286 in an embodiment may determine the criticality of such an update based on information received from the provider of such an update. For example, the developer of the operating system (e.g., Microsoft® Windows C)) may routinely provide various updates to firmware drivers, and metadata associated with such updates may identify whether the update is critical to successful operation of the driver or associated hardware. The update $CO_2$ footprint optimization system 250 in an embodiment may not interfere with installation of critical updates. However, in an embodiment in which the update is not identified as critical, the update $CO_2$ footprint optimization system 50 may proceed to determine whether installation of the available update would result in increased or decreased $CO_2$ emissions at the first client information handling system 200.

As described herein, the update $CO_2$ footprint optimization system may receive and implement a trained deep learning algorithm in an embodiment to estimate how much $CO_2$ emissions may be decreased by installing an available update for a firmware or software application based on the difference between the benchmark or ideal measure of $CO_2$ emitted during execution of the firmware or software application and the current $CO_2$ emitted during such execution. In addition, the update $CO_2$ footprint optimization system may estimate how much $CO_2$ may be emitted during installation of the update based on the $CO_2$ emitted during previous installation of prior updates to the same firmware or software application, or upon time of installation of the current update at other client information handling systems. The update $CO_2$ footprint optimization system in embodiments may recommend declining the update to the firmware or software application when the estimated $CO_2$ that may be emitted during the update exceeds the estimated decrease in $CO_2$ emissions that the update will afford.

Upon determining that an update is available for the client information handling system 200 in an embodiment, the sustainability engine 281 may transmit one or more values needed by the update $CO_2$ footprint optimization system 250 to make such determinations as those described directly above. For example, the sustainability engine 281 in an embodiment may transmit an average recent installation time value, and an average recent installation hardware component resource consumption percentage for the version of the software application or firmware driver for which the update is available to the first client information handling system 200. These values may assist the update $CO_2$ footprint optimization system 250 in an embodiment to estimate $CO_2$ that would be emitted during installation of the update and a degree to which $CO_2$ emissions may be decreased by such an installation (e.g., due to increased efficiency of the software application or firmware driver), as described in greater detail below with respect to FIG. 5A.

Upon notification by the sustainability engine 281 that an update is available for a software application or firmware driver at the first client information handling system 200, the update $CO_2$ footprint optimization system 250 may transmit to the sustainability engine 281 the current location at which it is drawing alternating current (A/C) power via a wall socket, or the location at which the battery was most recently charged if the first client information handling system is currently operating on battery power. In order to make a determination as to whether to delay installation of an available update, the update $CO_2$ footprint optimization system 250 in an embodiment may first estimate $CO_2$ that would be emitted during installation of the update and a degree to which $CO_2$ emissions may be decreased by such an installation (e.g., due to increased efficiency of the software application or firmware driver). Variables upon which such estimates may depend may include an estimate of $CO_2$ that would be emitted due to power consumption of various hardware components pursuant to installation of the available update or execution of the software application or firmware driver both before and after such an update. Any estimates of $CO_2$ emissions made based on consumption of power by various hardware components in an embodiment may depend upon the current geographic location of the information handling system 200, as described in greater detail with respect to FIG. 5A. In response, the sustainability engine 281 in an embodiment may transmit the recent distributed power $CO_2$ emissions value for the first client information handling system 200, and a current distributed $CO_2$ emissions value determined based on the current location or the location of the most recent battery charge to the update $CO_2$ footprint optimization system 250 at the first client information handling system 200, as also described with reference to FIG. 5A.

The update $CO_2$ footprint optimization system 250 or 271 in an embodiment may determine a current hardware component power consumption rate at the first client information handling system 200, as a precursor to estimating how much $CO_2$ emissions may decrease as a result of installing the available update. The current hardware component power consumption rate for a given software application or firmware driver in an embodiment may be determined by determining the power consumed by each hardware component per minute. For example, the power analytics module 240 in an embodiment may determine current usage of processing 242 resources, current usage of memory 246 resources, current usage of the display 245 resources, current usage of network interface device 220 resources, or current usage of the camera 248 resources. In order to gather such current rates, the update $CO_2$ footprint optimization system 250 in an embodiment may record these values over a short time period (e.g., five minutes, ten minutes) in which the software application or firmware driver for which an update is available is executing, then divide by the number of minutes in that short time period.

The update $CO_2$ footprint optimization system at the first client information handling system in an embodiment may determine an execution $CO_2$ emissions comparison index value to assist in determining whether the estimated power that will be consumed during the update exceeds the estimated decrease in power consumption that the update will afford. In order to make such a determination, the update $CO_2$ footprint optimization system in an embodiment may estimate how much power consumption may be decreased by installing an available update for a firmware or software application. This estimation may be the execution $CO_2$ emissions comparison index value in an embodiment. Such a comparison index value may be made based on the difference between the benchmark or ideal measure of $CO_2$ emitted during execution of the firmware or software application and the current $CO_2$ emitted during such execution, as described in greater detail below with respect to FIG. 5A.

The update $CO_2$ footprint optimization system 250 at the first client information handling system 200 in an embodiment may determine an installation $CO_2$ emissions comparison index value, which may be useful in estimating how much $CO_2$ will be emitted during an installation procedure of the update. This estimation may be made based on the power consumed during previous installation processes of prior updates to the same firmware or software application, or upon time of installation of the current update at other client information handling systems. In order to make such a determination, the update $CO_2$ footprint optimizations system 250 in an embodiment may determine a degree to which $CO_2$ emissions at the first client information handling system 200 may increase during such an installation process, as described in greater detail with respect to FIG. 5A.

The client device update $CO_2$ footprint optimization system 250 in an embodiment may determine whether the installation power consumption comparison index value is greater than the execution power consumption comparison index value, to determine whether installation of an available update will cause with a measure of $CO_2$ emissions that will be avoided due to increased efficiency of the software application or firmware driver resulting from such an installation. In an embodiment in which the execution $CO_2$ emissions comparison index value is higher than the installation $CO_2$ emissions comparison index value, this may indicate that an installation process of the update may result in an overall decrease in $CO_2$ emissions by increasing efficiency of the software application or firmware driver.

In an embodiment in which the installation $CO_2$ emissions comparison index value is higher than the execution $CO_2$ emissions comparison index value, the update $CO_2$ footprint optimization system 250 may recommend delaying the available update installation until prompted to proceed with such an available update, via a GUI 290. The specific details of such a future recommendation in an embodiment, and prompts for the update $CO_2$ footprint optimization system 250 to make such a future recommendation, may depend upon the cause of the installation $CO_2$ emissions comparison index value exceeding the execution $CO_2$ emissions comparison index value. For example, the balance between these two comparison index values in various embodiments described herein may be impacted by time of use of the software application or firmware driver, or by the geographic location of the first client information handling system 200. As described herein, some updates may increase the efficiency of hardware (e.g., through firmware or driver updates), or may increase the efficiency with which software applications consume hardware component resources (e.g., make calls to the CPU 242, store data in memory 246, use the display 245 or camera 246). These updates may significantly decrease an overall power consumption and resulting carbon footprint for a client information handling system 200, especially if the firmware or software application to be updated is routinely executed by the user. However, in other cases, such firmware or software application to be updated may be executed rarely or never. If the recent time of use for the software application or firmware driver is below a preset time of use or other execution usage threshold value (e.g., 10% of the most recent monitoring period), this may indicate that the installation $CO_2$ emissions comparison index value is higher than the execution $CO_2$ emissions comparison index value because the software application or firmware driver is being underutilized. Various embodiments described herein contemplate varying preset time of use threshold values (e.g., 1%, 5%, 15%), which may be selected by a user via a GUI 290, preset by an IT technician operating at the enterprise management system 205 or at the UEM platform 280. Ten percent is only an example time of use threshold value and is used for illustration rather than limitation and it is contemplated that any usage threshold metric may be used.

Recent time of use falling below such a preset time of use or other execution usage threshold value may indicate that an increase in efficiency of updating the software application may not provide a substantial difference in power consumption and $CO_2$ emissions associated with the execution of the seldom-used software application or firmware driver, because the software application or firmware driver is rarely used. In other words, for any given monitoring period, the user may have used the software application or firmware driver for which an update is available for too short a period or so seldom used to justify installation of an update for that application or driver and the $CO_2$ generation associated with that installation process. However, because usage of various applications and drivers may vary across a plurality of monitoring periods, it may become appropriate or justified to install such an update or future updates if the user increases usage of the application or driver in the future or at a later time of lower power consumption or $CO_2$ generation due to the type of power source. In contrast, if a user has never used an application or driver, it may be more appropriate to delete the application or firmware and all associated files as described in greater detail below with respect to FIG. 5B.

In an embodiment in which the user has executed the application or driver in the past, but the usage of that application or driver falls below the time of use threshold value during the most recent monitoring period, the update $CO_2$ footprint optimization system 250 may reevaluate the installation $CO_2$ emissions comparison index value and execution $CO_2$ emissions comparison index value during the next monitoring period. As described herein, usage of various applications and drivers may vary across a plurality of monitoring periods. As a consequence, it may become appropriate or justified to install such an update or future updates if the user increases usage of the application or driver in the next monitoring period. The time of use of the software application or firmware driver may change markedly between such monitoring periods, and the measure of $CO_2$ emitted per Watt of power consumed may also vary (e.g., based on changes in geographic location between monitoring periods, as described directly below). Thus, it is feasible that the installation process of an available update may cause more $CO_2$ emissions during an installation process than such an installation would conserve (e.g., through an increase in efficiency) during a first monitoring period, but for the reverse to be true during an immediately following monitoring period. In other words, the installation of such an available update may conserve more $CO_2$ emissions (e.g., through increased efficiency) than it would cause if it were installed one day, one week, or one month later than the date on which the update initially became available.

In an embodiment in which the update $CO_2$ footprint optimization system 250 determines the time of use value is not the primary variable affecting the balance between the installation $CO_2$ emissions comparison index value and the execution $CO_2$ emissions comparison index value, the update $CO_2$ footprint optimization system 250 may determine the impact on these comparison index values by the geographic location of the client information handling system 200. As described herein, the balance between these two comparison index values in various embodiments described herein may be impacted by the geographic location of the first client information handling system 200, which may affect the $CO_2$ emitted during generation of power by plants supplying power to that geographic location. More specifically, a variable that may impact such comparison index values may be the distributed power $CO_2$ emissions values determined at the current location and determined during the most recent monitoring period based on the location of the first client information handling system during that monitoring period. The distributed power CO2 emissions value may describe a measure of CO2 (e.g., in pounds) emitted during the generation of each Watt or kilowatt (kW) of power at the power plant supplying power to devices within the geographic location of the first client information handling system. In an embodiment in which the first client information handling system 200 is currently operating on A/C power supplied by a wall outlet, for example, the current distributed power CO2 emissions value may be specific to the current geographic location for the first client information handling system 200. In an embodiment in which the first client information handling system 200 is currently operating on battery power, the current distributed power CO2 emissions value may be specific to the geographic location measured for the first client information handling system 200 at the time of most recent battery charging.

This current distributed power CO2 emissions value may differ widely between various geographic locations based on the types of power generation used to produce such power. For example, some power plants use clean power sources such as hydro-electric power, wind power, or solar power. Other power plants may generate power primarily through the burning of fossil fuels (e.g., liquid natural gas, petroleum, coal), which may be associated with much higher CO2 emissions than cleaner power sources. Thus, a change in geographic location between monitoring periods in an embodiment may cause a significant change in both the installation CO2 emissions comparison index value and the execution CO2 emissions comparison index value.

The update CO2 footprint optimization system 250 in an embodiment may determine if the distributed power CO2 emissions value at the current location differs from the distributed power CO2 emissions value determined for the most recent monitoring period by a location-based threshold value (e.g., 10%, 15%, 25%, 50%, etc.). Such a significant difference may indicate that the change in location between the current time and the most recent monitoring period is causing the installation CO2 emissions comparison index value to exceed the execution CO2 emissions comparison index value. This may indicate that installation of the update at the current time may cause an increase in CO2 emissions due to installation that may not be offset by increased efficiency due to such an installation. However, this may not be the case in the future, if the first client information handling system 200 moves to another geographic location associated with a different distributed power CO2 emissions value. In such an embodiment, the update CO2 footprint optimization system 250 may reevaluate the comparison index values when the location of the client information handling system 200 changes or upon next charging of the battery.

If the distributed power CO2 emissions value at the current location does not differ from the distributed power CO2 emissions value determined for the most recent monitoring period by a location-based threshold value, the update CO2 footprint optimization system 250 may reevaluate the comparison index values during the next monitoring period in which multiple variables for the comparison index values may change. By performing such a reevaluation upon occurrence of such various future conditions, the update CO2 footprint optimization system 250 in an embodiment may adaptively adjust to changing circumstances at the first client information handling system 200 to continuously ensure updates are installed only when the installation of such an available update may conserve more CO2 emissions (e.g., through increased efficiency) than it would cause.

The GUI 290 in an embodiment may display a recommendation for installation of the available update to the software application or firmware driver. The recommendation displayed may be based on a determination, via the trained deep learning algorithm of the update CO2 footprint optimization system 250, as to whether such an installation will increase or decrease the CO2 footprint for the client information handling system 200. For example, in an embodiment in which the execution CO2 emissions comparison index value is higher than the installation CO2 emissions comparison index value, this may indicate that installation of the update may result in an overall decrease in CO2 emissions by increasing efficiency of the software application or firmware driver. In such an embodiment, the update CO2 footprint optimization system may recommend installation of the update via the GUI 290. In another aspect of such an embodiment, the update CO2 footprint optimization system may allow an automatic update initiated by the update service 286 or the UEM platform 280 to proceed at the client information handling system 200.

In an embodiment in which the installation CO2 emissions comparison index value is higher than the execution CO2 emissions comparison index value, the update CO2 footprint optimization system 250 may recommend delaying the available update installation until prompted to proceed with such an available update, via the GUI 290. The specific details of such a future recommendation in an embodiment, and prompts for the update CO2 footprint optimization system 250 to make such a future recommendation may depend upon the cause of the installation CO2 emissions comparison index value exceeding the execution CO2 emissions comparison index value. For example, in an embodiment in which the balance between these two comparison index values is caused by recent time of use falling below a preset time of use threshold value, this may indicate that an increase in efficiency of the software application may not provide a noticeable difference in power consumption. In such a scenario, CO2 emissions associated with the execution of the software application or firmware driver may not decrease with installation of the update, because the software application or firmware driver is rarely used.

In an embodiment in which the user has never executed the application or driver, the update CO2 footprint optimization system 250 may recommend deletion of the software application or firmware driver and associated files. In such a case, the update CO2 footprint optimization system 250 in an embodiment may determine that the best way to optimize CO2 emissions associated with the software application or firmware driver is to uninstall it. This may end any analysis of future available updates, thus conserving processing resources and future power consumption due to such consideration. Deletion of related files may decrease unnecessary consumption of memory 246 and processing 242 resources and avoid any potential auto-execution of any of these files, which may complicate or interfere with proper and efficient functioning of other software application and firmware drivers.

In an embodiment in which the user has used the application or driver, but not enough to justify an update installation, the update CO2 footprint optimization system 250 may recommend delaying the installation process of the update until a reevaluation of the installation CO2 emissions comparison index value and execution CO2 emissions comparison index value during the next monitoring period. For example, the update CO2 footprint optimization system 250 may recommend via GUI 290 that the user delay the installation process of a pending or available update until further notice is provided via the GUI 290 by the update $CO_2$ footprint optimization system 250.

In an embodiment in which the update $CO_2$ footprint optimization system 250 determines the distributed power $CO_2$ emissions value at the current location differs from the distributed power $CO_2$ emissions value determined for the most recent monitoring period by a location-based threshold value (e.g., 10%, 15%, 25%, 50%, etc.), the update $CO_2$ footprint optimization system 250 may recommend, via GUI 290, that the user delay the installation process of the update until a reevaluation of the comparison index values has been performed. As described above and below with respect to FIG. 5B, the update $CO_2$ footprint optimization system 250 in such an embodiment may reevaluate the comparison index values when the location of the client information handling system 200 changes or upon next charging of the battery. In such a way, the update $CO_2$ footprint optimization system may optimize the update process for various firmware or software applications based on actual usage and power consumption statistics to decrease the carbon footprint caused by updating and execution of those firmware or software applications FIG. 3 is a flow diagram illustrating a method of training a deep learning algorithm system at a $CO_2$ optimization engine at a UEM platform for a benchmark time of use and power consumption values associated with updating and execution of firmware and software applications at a client information handling system during a testing period according to an embodiment of the present disclosure. As described herein, the client device update $CO_2$ footprint optimization system in an embodiment may compare telemetries gathered during the testing period to those gathered during various monitoring periods at the same client information handling system or across a plurality of client information handling systems to estimate the amount of power that may be consumed during a pending update to firmware or software, as well as a degree to which such an update may result in decreased power consumption of hardware components due to increased efficiency of the firmware or software caused by the update. These telemetry values or analytic data may be transmitted to the UEM platform to train the deep learning algorithm as part of the $CO_2$ optimization engine at the UEM platform in an embodiment. At block 302, a training period for a client information handling system may begin immediately following initial use of the client information handling system by a user. For example, in an embodiment described with reference to FIG. 2, the client device update $CO_2$ footprint optimization system 250 in an embodiment may gather data regarding hardware configuration and power consumption from the power analytics module 240 and data regarding software performance and processor/memory usage from the application analytics module 230 during a testing period. These telemetry values or analytic data may also be transmitted to the UEM platform to train the deep learning algorithm as part of the $CO_2$ optimization engine at the UEM platform in an embodiment. For example, the update $CO_2$ footprint optimization system 250 may gather such data during a testing period, beginning upon initial usage of the first client information handling system 200 by the user, and extending for some preset time period (e.g., six months). The UEM $CO_2$ optimization engine 285 in an embodiment may train the deep learning algorithm to determine benchmark values for power consumption of various hardware components (e.g., 220, 241, 242, 243, 244, 245, 246, 247, 248, or 249) due to firmware or software application usage for such a testing period, as described in greater detail below at blocks 310, 312, 314, and 316.

An application analytics module may track firmware and software application updating, usage and functionality for a plurality of firmware or software applications running or idle during the monitoring period at block 304. For example, in an embodiment described with reference to FIG. 2, the application analytics module 230 may track which software applications are running or idle (e.g., executing in the background) at various times, and track current versions of software applications and times at which updates to such software applications are performed. In still another example, the application analytics module 230 may determine current usage of processing resources as a percentage of total capacity for local processor 242 due to each of a plurality of executing software applications. In yet another example, the application analytics module 230 may determine current usage of memory resources as a percentage of total capacity for memory 246 due to each of a plurality of executing software applications. In still another example, the application analytics module 230 may determine current usage of network interface device resources as a percentage of total throughput for the network interface device 220 due to each of a plurality of executing software applications. As still another example, the application analytics module 230 may determine current usage of display or camera resources as a percentage of active camera image capture or display time used in displaying a GUI for each of a plurality of executing software applications. Information gathered by the application analytics module 230 in such an embodiment may be communicated to the UEM $CO_2$ optimization engine 285 via the client device update $CO_2$ footprint optimization system 250.

At block 306, the power analytics module may track power consumption of multiple hardware components in the client information handling system in an embodiment. For example, the power analytics module 240 in an embodiment may monitor power consumption by each of the various hardware components (e.g., 220, 241, 242, 243, 244, 245, 246, 247, 248, or 249) in an embodiment. Such hardware power consumption may be attributed to updating or execution of specific firmware or software applications, based on percentage usage of resources for a given hardware component during such updating or execution. For example, the power analytics module 240 in an embodiment may determine current usage of processing resources during updating or execution of firmware or software applications as a percentage of total capacity for the processor 242 (e.g., central processing unit (CPU), graphics processing unit (GPU), or visual processing unit (VPU)). In still another example, the power analytics module may determine current usage of memory resources during updating or execution of firmware or software as a percentage of total capacity for memory 246, and time required to process requests to access such memory 246. In yet another example, the power analytics module 240 in an embodiment may determine a current usage of the display during updating or execution of firmware or software as a percentage of display time in which GUI for a specific firmware or software application is visible or displayed, and a usage mode for the display 245, such as day mode, night mode, power reserve mode, or gaming mode (e.g., high-resolution). In another example, the power analytics module 240 in an embodiment may determine current usage of network interface device resources during updating or execution of firmware or software as a percentage of total capacity for the network interface device 220 to transceive data (e.g., percentage of total available throughput used). All information accessed in such a way by the power analytics module 240 in an embodiment may be communicated to the UEM CO2 optimization engine 285 via the client device update CO2 footprint optimization system 250.

The power analytics module in an embodiment may determine firmware versions and update history at block 308. In an embodiment, the power analytics module 240 may be capable of determining the current versions of drivers for various hardware components (e.g., 220, 241, 242, 243, 244, 245, 246, 247, 248, or 249). As described herein, the power analytics module 240 may identify download, storage, and time of execution data for each installation file (e.g., files having the extension ".ini," or ".sys"), and transmit that information to the UEM CO2 optimization engine 285 via the client device update CO2 footprint optimization system 250. In some embodiments, the power analytics module 240 may also track power consumed during an installation process for updating of such drivers. In still other embodiments, the power analytics module 240 may further determine power consumed during updates made to various software applications executing via the processor 242 (e.g., CPU, GPU, or VPU).

At block 310, the CO2 optimization engine 285 in an embodiment may train the deep learning algorithm to determine a benchmark time of use value over the preset testing period for each firmware or software application based on application analytics. For example, the CO2 optimization engine 285 in an embodiment may determine, for each firmware or software application, a benchmark time of use value as a duration of time in which the firmware or software was in use by the client information handling system 200. As described herein, the application analytics module 230 in an embodiment may track which software applications are running or idle (e.g., executing in the background) at various times, track current versions of software applications and times at which updates to such software applications are performed, and transmit that data to the UEM CO2 optimization engine 285 via the client device update CO2 footprint optimization system 250. Firmware or software applications that are rarely or never used may not need to be updated since such updates will not increase efficiency of power usage during execution of those applications, but may cause an unnecessary consumption of power during the installation or update process.

The CO2 optimization engine 285 in an embodiment may train the deep learning algorithm to determine a benchmark update installation time value as time of installation for updates to all firmware or software applications over the preset testing period at block 312. For example, the CO2 optimization engine 285 in an embodiment may train the deep learning algorithm to determine, for each firmware or software application, a benchmark update installation time value as a duration of time consumed during installation of one or more updates for each specific firmware or software application the client information handling system 200. As described herein, the power analytics module 240 may identify download, storage, and time of execution data for each installation file (e.g., files having the extension ".ini," or ".sys"), and transmit that information to the UEM CO2 optimization engine 285 via the client device update CO2 footprint optimization system 250 for training. This benchmark update installation time value may assist in estimating an amount of power that may be consumed by future updates at the same (e.g., 200) or different client information handling system (e.g., 270).

At block 314, the CO2 optimization engine 285 in an embodiment may train the deep learning algorithm to determine a benchmark installation hardware component resource consumption percentage as during installation of updates to all firmware or software applications over the testing period. For example, the CO2 optimization engine 285 in an embodiment may determine, for each firmware or software application, a benchmark update hardware component resource consumption percentage as the percentage resources of which are used during installation of updates to each specific firmware or software application at the client information handling system 200. More specifically, the CO2 optimization engine 285 in an embodiment may train the deep learning algorithm to determine, for each firmware or software application, a percentage of resources for various hardware components (e.g., 220, 241, 242, 243, 244, 245, 246, 247, 248, or 249) that are being consumed during updating of such firmware or software. This may provide a benchmark measure of efficiency with which the software application or firmware driver utilizes such hardware component resources.

As described herein, the power analytics module 240 may identify download, storage, and time of execution data for each installation file (e.g., files having the extension ".ini," or ".sys"), and transmit that information to the UEM CO2 optimization engine 285 via the client device update CO2 footprint optimization system 250. In addition, the power analytics module 240 may also track usage of various hardware components by each executed process (e.g., execution of ".ini" or ".sys" files) during installation of drivers or software applications. For example, the power analytics module 240 in an embodiment may determine that execution of an installation file (e.g., ".ini" or ".sys") consumed 10% of processing resources, 50% of memory resources, and 2% of network interface device resources).

The CO2 optimization engine 285 in an embodiment may train the deep learning algorithm to determine a benchmark execution hardware component resource consumption percentage as a percentage of all hardware component resources consumed during execution of all firmware or software applications over the testing period at block 316. For example, the update CO2 footprint optimization system 250 in an embodiment may determine, for each firmware or software application, a benchmark execution hardware component resource consumption percentage as a percentage of resources for various hardware components (e.g., 220, 241, 242, 243, 244, 245, 246, 247, 248, or 249) that are being consumed during execution of such firmware or software. More specifically, the power analytics module 240 in an embodiment may determine that execution of a driver or software application (e.g., videoconferencing application) during the training period consumed 30% of processing resources, 10% of memory resources, 25% of network interface device resources), and 70% of camera resources. This is only one example of determination of a benchmark execution hardware component resource consumption percentage. Other drivers or software applications may be associated with different proportions of hardware component resource consumption, or with resource consumption at other hardware components.

At block 318, the update CO2 footprint optimization system in an embodiment may transmit the gathered analytics and benchmark time and hardware component resource consumption percentages to train the deep learning algorithm at the CO2 optimization engine 285. The client device update CO2 footprint optimization system 250 may gather the information received from the power analytics module 240 and the application analytics module 230 and any determined benchmark values (e.g., as described above at blocks 310, 312, 314, or 316) into a telemetry for the training period and transmit that telemetry to the UEM platform 280. An update $CO_2$ footprint optimization system 271 operating at a second client information handling system 270 may also transmit similar telemetries, indicating software application usage and power usage at the second information handling system 270, as described in greater detail below with respect to FIG. 5 at block 502.

The user of the client information handling system may set a preferred monitoring period for future monitoring of power consumed during updates to firmware and software in an embodiment at block 320. For example, in an embodiment described with reference to FIG. 2, the client device update $CO_2$ footprint optimization system 250 in an embodiment may gather data regarding hardware configuration and power consumption from the power analytics module 240 and data regarding software performance and usage of various hardware components from the application analytics module 230 at preset intervals. For example, such a preset interval may be set to a default monitoring period value (e.g., one hour, one day, one week), or may be set by the user of the first client information handling system 200 via the graphical user interface (GUI) 290. At a later time, the trained deep learning algorithm may be deployed to the client device update $CO_2$ footprint optimization system 250 at the client information handling system 200. The client device update $CO_2$ footprint optimization system 250 in an embodiment may compare telemetries and analytic data that was gathered during the testing period from client information handling system (e.g., 200) or across a plurality of client information handling systems (e.g., 200 and 270) and benchmarks determined for the same to current analytic data gathered during various of such user-specified monitoring periods at the client information handling system 200 to estimate the amount of power that may be consumed during a pending update to firmware or software, as well as a degree to which such an update may result in decreased power consumption of hardware components (e.g., 220, 241, 242, 243, 244, 245, 246, 247, 248, or 249) due to increased efficiency of the firmware or software caused by the update, as described in greater detail below with respect to FIGS. 5A and 5B. The method for training the deep learning algorithm to determine benchmark time of use and hardware component resource consumption percentages associated with updating and execution of firmware and software applications at a client information handling system during a testing period may then end.

FIG. 4 is a flow diagram illustrating a method of training the deep learning algorithm to determine to determine recent time of use and power consumption values associated with updating and execution of firmware and software applications at a client information handling system during a recent monitoring period according to an embodiment of the present disclosure. As described herein, the client device update $CO_2$ footprint optimization system in an embodiment may routinely monitor power consumption, updates, and execution of such a firmware or software application during routine monitoring periods, following the testing period, with a deployed deep learning algorithm trained during a training period. These current values or current analytics data gathered during a monitoring period on a client information handling system may be used to estimate how much power consumption may be decreased by installing an available update for the firmware or software application based on the difference between the benchmark measure of power consumed during execution of the firmware or software application and the current power consumption during such execution, as described in greater detail below. FIG. 4 describes a method for gathering information from a plurality of client information handling systems, and doing so repeatedly over consecutive monitoring periods to be transmitted to a UEM platform and a $CO_2$ optimization engine to further train the deep learning algorithm to determine $CO_2$ generation comparison relative to a determination to recommend installing available firmware or software updates as well as other recommendations.

At block 402, the power analytics module and application analytics module may gather power analytics data and application analytics data during the preset monitoring period in an embodiment from a plurality of client information handling systems. For example, the power analytics module may repeat the methods described with reference to FIG. 3 at blocks 306 and 308 over the monitoring period set by the user or to a default value at block 320. As another example, the application analytics module may repeat the methods described with reference to FIG. 3 at block 304 over the monitoring period set by the user or to a default value at block 320. In an example embodiment described with reference to FIG. 2, this may be performed at each of several client information handling systems (e.g., including 200 and 270), and may be repeated for several routine monitoring periods.

The UEM $CO_2$ optimization engine in an embodiment may receive analytic data to train the deep learning algorithm or provide for benchmark values for the methods herein at the $CO_2$ optimization engine. The $CO_2$ optimization engine may receive this analytic data to determine an installation time value over the monitoring period for firmware or software applications based on application analytics at block 404. The time required to perform an installation process of a first update of a software application or firmware driver may be helpful in estimating the time required, and power likely to be consumed during installation of a later update to that same software application or firmware driver. However, the UEM $CO_2$ optimization engine in an embodiment may only determine an installation time value if an update is installed during the testing period or monitoring period. In other words, there may not be a benchmark installation time value or previous installation time value describing time required to install a previous update in an embodiment if no updates for the software application of firmware driver were installed during the testing period or previous monitoring periods. As a consequence, the UEM $CO_2$ optimization engine in an embodiment may gather data about installation of the same or previous updates from other client information handling systems to train its deep learning algorithm. For example, the time required to perform an installation process of a given update for a software application or firmware driver at a first client information handling system may be helpful in estimating the time required, and power likely to be consumed during installation of that same update at a second client information handling system.

The UEM $CO_2$ optimization engine in an embodiment may perform a similar method to train a deep learning algorithm described with reference to FIG. 3 at block 312 over the monitoring period set by the user or to the default value at block 320. In an example embodiment described with reference to FIG. 2, this may be performed at each of several client information handling systems (e.g., including 200 and 270), and may be repeated for several routine monitoring periods. Installation time value gathered during a most recent monitoring period in an embodiment may be referred to herein as a recent installation time value.

At block 406, the UEM CO2 optimization engine in an embodiment may receive analytic data for training to determine a recent installation hardware component resource consumption percentage over the most recent monitoring period for the software application or firmware drivers upon which updates were performed. Again, this may be performed across a plurality of information handling systems, including 200 and 270, and repeatedly during consecutive monitoring periods. For example, the UEM CO2 optimization engine may repeat the method performed at block 314 of FIG. 3 during the monitoring period defined at block 320. An installation hardware component resource consumption percentage gathered during a most recent monitoring period in an embodiment may be referred to herein as a recent installation hardware component resource consumption percentage. The UEM CO2 optimization engine in an embodiment may only determine an installation hardware component resource consumption percentage if an update is installed during the testing period or monitoring period. In other words, there may not be a benchmark installation hardware component resource consumption percentage in an embodiment if no updates for the software application or firmware driver were installed during the testing period.

In an embodiment in which a benchmark installation hardware component resource consumption percentage has been recorded, the recent installation hardware component resource consumption percentage in an embodiment may vary from the benchmark percentage if the size or complexity of different update versions changes over time. For example, an update installed during the training period may include very minor adjustments to the software application or firmware driver, while a later update included substantial adjustments. The installation hardware component resource consumption percentage may also change over time if later installations include duplicative storage of files already saved to memory in previous updates. The recent installation hardware component resource consumption percentage in an embodiment may be used to estimate power that will be consumed and CO2 that will be emitted if the user chooses to install the pending update, as described in greater detail below with respect to FIGS. 5A and 5B.

As described herein, the installation hardware component resource consumption percentage may be recorded for various updates and across a plurality of information handling systems. The benchmark or recent installation hardware component resource consumption percentage recorded for the installation process of a first update to a given software application or firmware driver at a first client information handling system in an embodiment may be helpful in estimating power that would be consumed, and thus CO2 that would be emitted during installation of a second or later update to the same software application or firmware driver at the same client information handling system, as described below with respect to FIGS. 5A and 5B. Additionally, recent installation hardware component resource consumption percentage recorded for the installation process of a specific update to a given software application or firmware driver at a first client information handling system in an embodiment may be helpful in estimating power that would be consumed, and thus CO2 that would be emitted during installation of the same specific update to the software application or firmware driver at a second client information handling system, as described below with respect to FIGS. 5A and 5B.

The update CO2 footprint optimization systems at a plurality of client information handling systems in an embodiment may determine at block 408 a time of use value for software applications or firmware drivers at each of the plurality of client information handling systems. For example, the UEM CO2 optimization engine in an embodiment may perform the same method to train the deep learning algorithm and gather analytics data and benchmarks described with reference to FIG. 3 at block 310 over the monitoring period set by the user or to the default value at block 320. In an example embodiment described with reference to FIG. 2, this may be performed at each of several client information handling systems (e.g., including 200 and 270), and may be repeated for several routine monitoring periods. Time of use value gathered during a most recent monitoring period in an embodiment may be referred to herein as a recent time of use value. A measured difference between the benchmark time of use value and the recent time of use value in an embodiment may indicate greater or lesser dependence of the user on such firmware or software applications over time.

At block 410, the update CO2 footprint optimization system at a plurality of client information handling systems may send analytics data to the CO2 optimization engine to determine an execution hardware component resource consumption value during execution of all software applications or firmware drivers over a monitoring period for each of the plurality of client information handling systems. Again, this may be performed across a plurality of information handling systems, including 200 and 270, and repeatedly during consecutive monitoring periods. For example, the UEM CO2 optimization engine may repeat the method performed at block 316 of FIG. 3 during the monitoring period defined at block 320 while training the deep learning algorithm. An execution hardware component resource consumption percentage gathered during a most recent monitoring period in an embodiment may be referred to herein as a recent execution hardware component resource consumption percentage. The UEM CO2 optimization engine in an embodiment may only determine an execution hardware component resource consumption percentage if the user executed the software application or firmware driver for which the update is available during the testing period or monitoring period. In other words, there may not be a recent execution hardware component resource consumption percentage in an embodiment if the time of use value for the recent monitoring period, as determined at block 408 is zero.

In an embodiment in which a benchmark execution hardware component resource consumption percentage has been recorded, the recent execution hardware component resource consumption percentage in an embodiment may vary from the benchmark percentage if the software application or firmware driver has increased or decreased the efficiency with which it utilizes hardware components during execution over time. For example, many software or firmware updates are designed specifically to avoid inefficient use of those resources, such as unnecessary, repeated, or failed calls to a processor or various firmware, unnecessary, unused, or duplicative file storage, or unnecessary commands to various hardware components to operate in a high-performance mode, rather than a power conservation mode. Thus, any marked increase in execution hardware component resource consumption percentage from the benchmark value or between consecutive monitoring periods may indicate a need to install an available update that may increase such efficiency.

Analytics and determined values gathered or reported during the monitoring period in an embodiment may be reported to the CO2 optimization engine at block 412. For example, the location measurement, power analytics, and application analytics gathered at block 402 may be transmitted to the UEM CO2 optimization engine 285 from the update CO2 footprint optimization system 250. As another example, the installation time value determined at block 404 and installation hardware component resource consumption percentage determined at block 406 may be transmitted to the UEM CO2 optimization engine 285 for later assistance in estimating power consumption and CO2 emissions for future update installations. As yet another example, the time of use value determined at block 408 and execution hardware component resource consumption percentage determined at block 410 in an embodiment may be transmitted to the UEM CO2 optimization engine 285 for later assistance in estimating whether installation of a future update will increase efficient use of hardware components and thus decrease power consumption and CO2 emissions during execution of the software application or firmware driver.

At block 414, the CO2 optimization engine may train the deep learning algorithm with the various types of received analytic data to determine average values and distributed power CO2 emissions values across a plurality of client information handling systems in an embodiment. For example, the UEM CO2 optimization engine 285 may work with the CO2 optimization engine 285 to determine a distributed power CO2 emissions value for each of the reporting client information handling systems (e.g., 200 and 270) based on their measured geographic locations, as received at the UEM CO2 optimization engine 285 at block 412. As described herein, the distributed power CO2 emissions value in an embodiment may describe the amount of CO2 or other GHGs emitted during generation of each Watt of power at a specific power plant providing power to all devices within an area including the geographic location of a client information handling system. The amount of GHG emitted per Watt of power may differ widely across such power plants, based on the method of power production (e.g., solar power vs. coal-burning plant). Thus, the distributed power CO2 emissions value (e.g., in CO2 pounds per Watt) may vary markedly between geographic locations. As such, this value may impact any estimate of CO2 that would be emitted during consumption of power at a client information handling system due to an installation process of an update for a software application or firmware driver, or during execution of the software application or firmware driver.

The CO2 optimization engine in an embodiment may also train the deep learning algorithm with the various types of received analytic data to determine an average recent installation time value and an average recent installation hardware component resource consumption percentage determined across a plurality of client information handling systems performing an installation process of the same update to the same software application or firmware driver at block 414. This average recent installation time value and average recent installation hardware component resource consumption percentage may be determined by taking an average of values received during one or more recent monitoring periods as recorded by a plurality of client information handling systems (e.g., as described with respect to blocks 404 and 406). As described herein, these values may be useful in estimating the power that may be consumed, and thus CO2 that may be emitted during the installation process of the same update at another client information handling system, as described in greater detail below with respect to FIG. 5A.

In an embodiment, the CO2 optimization engine may also train the deep learning algorithm with the various types of received analytic data to determine an average recent execution hardware component resource consumption percentage across a plurality of client information handling systems executing the software application or firmware driver following installation of the update that is currently available for installation at another client information handling system. This average recent execution hardware component resource consumption percentage may be determined by taking an average of values received during one or more recent monitoring periods as recorded by a plurality of client information handling systems (e.g., as described with respect to block 410). As described herein, these values may be useful in estimating the power that may be consumed, and thus CO2 that may be emitted during execution of the software application or firmware driver following installation of the available update at another client information handling system, as described in greater detail below with respect to FIG. 5A. The method for recording recent time of use and power consumption values associated with updating and execution of firmware and software applications at a client information handling system may then end.

Figure 5B:
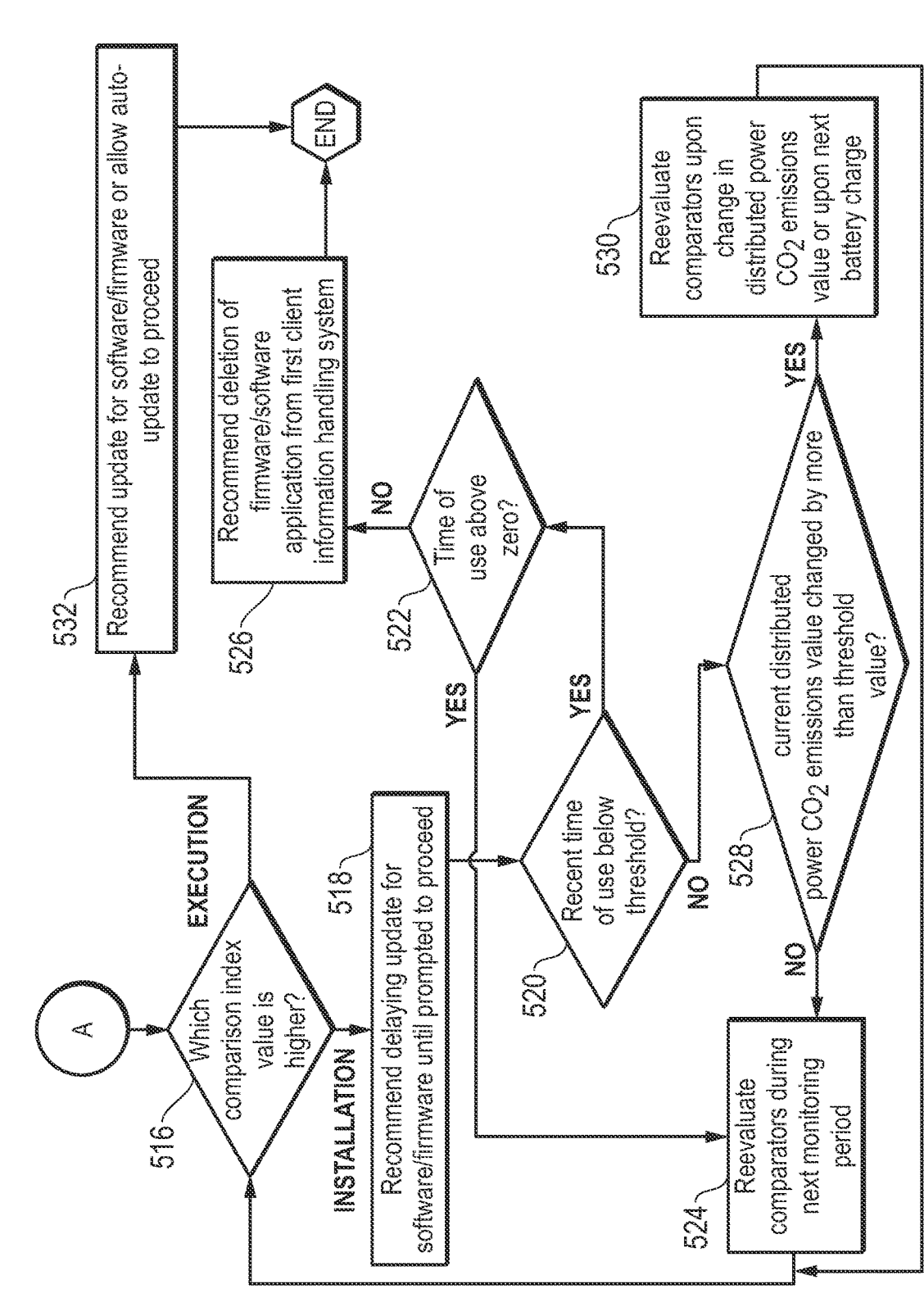
FIG. 5B is a flow diagram illustrating a method of recommending initiation, delay, or cancellation of update installation according to an embodiment of the present disclosure.

FIGS. 5A and 5B are a flow diagram illustrating a method of recommending initiation, delay, or cancellation of update installation based on a comparison between carbon dioxide (CO2) estimated to be emitted during the installation process and CO2 estimated to be conserved as a consequence of the installation according to an embodiment of the present disclosure. The update CO2 footprint optimization system may execute a trained deep learning algorithm in an embodiment received form a UEM platform CO2 optimization engine and trained there. As described herein, the update CO2 footprint optimization system at the client information handling system in an embodiment may estimate how much power consumption may be decreased by installing an available update for a firmware or software application based on the difference between the benchmark or ideal measure of power consumed during execution of the firmware or software application and the current power consumption during such execution. In addition, the update CO2 footprint optimization system may estimate how much power will be consumed during an installation process of the update based on the power consumed during previous installation of prior updates to the same firmware or software application, or upon time of installation of the current update at other client information handling systems. The update CO2 footprint optimization system in embodiments may recommend declining the update to the firmware or software application when the estimated power that will be consumed during the update at the client information handling system exceeds the estimated decrease in power consumption that the update will afford.

At block 502, the sustainability engine in an embodiment may determine that a non-critical updated version of a software application or firmware driver is available for installation at a first client information handling system. For example, in an embodiment described with respect to FIG. 2, the UEM platform 280 may work with the update service 286 to automatically update software applications or firmware drivers for hardware components, as needed, or as accepted by a user of the client information handling system 200. The update service 286 in an embodiment may determine the criticality of an update based on information received from the provider of such an update. For example, the developer of the operating system (e.g., Microsoft® Windows C)) may routinely provide various updates to firmware drivers, and metadata associated with such updates may identify whether the update is critical to successful operation of the driver or associated hardware. The update $CO_2$ footprint optimization system 250 in an embodiment may not interfere with installation of critical updates. However, in an embodiment in which the update is not identified as critical, the update $CO_2$ footprint optimization system 50 may proceed to determine whether installation of the available update would result in increased or decreased $CO_2$ emissions at the first client information handling system 200.

The sustainability engine in an embodiment may transmit an average recent installation time value, and an average recent installation hardware component resource consumption percentage for the version of the software application or firmware driver for which the update is available to the first client information handling system at block 504. As described herein, the update $CO_2$ footprint optimization system 250 in an embodiment may delay or cancel non-critical updates to software applications or firmware drivers when such an installation process is likely to increase $CO_2$ emissions at the first client information handling system 200, rather than decrease $CO_2$ emissions. In order to make such a determination, the update $CO_2$ footprint optimization system 250 in an embodiment may first estimate $CO_2$ that would be emitted during the installation process of the update and a degree to which $CO_2$ emissions may be decreased by such an installation (e.g., due to increased efficiency of the software application or firmware driver) via the trained deep learning algorithm.

Variables upon which such estimates may depend may include an average recent installation time value, or an average recent installation hardware component resource consumption percentage for the version of the software application or firmware driver for which the update is available. As described above with respect to FIG. 4 at block 404, a plurality of client information handling systems (e.g., including 200 and 270) may have transmitted recent installation time values indicating a duration of time required to install the currently available update during a previous monitoring period to the UEM $CO_2$ optimization engine 285 for storage in telemetry 282 and during training. As also described above with respect to FIG. 4 at block 406, a plurality of client information handling systems (e.g., including 200 and 270) may have transmitted recent installation hardware component resource consumption percentages indicating a percentage of resources for each hardware component (e.g., 220, 241, 242, 243, 244, 245, 246, 247, 248, or 249) consumed during installation of the currently available update during a previous monitoring period to the UEM $CO_2$ optimization engine 285 for storage in telemetry 282.

The trained deep learning algorithm of the update $CO_2$ footprint optimization system 250 may determine an average recent installation time value and an average recent installation hardware component resource consumption percentage of the available update by taking an average of these values gathered at blocks 404 and 406. Upon determining a non-critical update for a given software application or firmware driver is available for the first client information handling system 200 in an embodiment, the average recent installation times value and average recent installation hardware component resource consumption percentage are determined at the update $CO_2$ footprint optimization system 250. These values are used by the update $CO_2$ footprint optimization system 250 in estimating $CO_2$ that would be emitted due to the installation process of such an available, non-critical update at the first client information handling system 200, as described below with respect to block 514.

At block 506, the first client information handling system may transmit to the sustainability engine the current location at which it is drawing alternating current (A/C) power via a wall socket, or the location at which the battery was most recently charged if the first client information handling system is currently operating on battery power. In order to make a determination as to whether to delay the installation process of an available update, the update $CO_2$ footprint optimization system 250 in an embodiment may first estimate $CO_2$ that would be emitted during the installation process of the update and a degree to which $CO_2$ emissions may be decreased by such an installation (e.g., due to increased efficiency of the software application or firmware driver). Variables upon which such estimates may depend may include an estimate of $CO_2$ that would be emitted due to power consumption of various hardware components pursuant to installation of the available update or execution of the software application or firmware driver both before and after such an update. Any estimates of $CO_2$ emissions made based on consumption of power by various hardware components in an embodiment may depend upon the geographic location of the information handling system 200. As described herein, the $CO_2$ emitted due to power consumption of various hardware components varies based on the $CO_2$ emitted per Watt (or kW) by the supplier of that power. For example, some power plants use clean power sources such as hydro-electric power, wind power, or solar power. Other power plants may generate power primarily through the burning of fossil fuels (e.g., liquid natural gas, petroleum, coal), which may be associated with much higher $CO_2$ emissions than cleaner power sources. Thus, the geographic location of the client information handling system 200, and consequently the power plant that is supplying power consumed by the client information handling system 200 may impact any estimate of $CO_2$ emissions due to power consumption.

The update $CO_2$ footprint optimization system 250 in an embodiment may transmit location information needed to estimate $CO_2$ currently being emitted as a consequence of various hardware components consuming power during current execution of the software application or firmware driver for which an update is available. In an embodiment in which the information handling system 200 is operating on A/C power, the hardware components are consuming power generated by a power plant supplying power to the current geographic location for the client information handling system 200. As a consequence, the update $CO_2$ footprint optimization system 250 may transmit the current geographic location for the client information handling system 200 to the sustainability engine 281. In an embodiment in which the information handling system 200 is operating on battery power, the hardware components are consuming power generated by a power plant supplying power at the geographic location in which the client information handling system 200 most recently charged the battery. As a consequence, the update $CO_2$ footprint optimization system 250 may transmit the geographic location at which the client information handling system 200 most recently charged the battery to the sustainability engine 281.

The sustainability engine in an embodiment may transmit the recent distributed power $CO_2$ emissions value for the first client information handling system, a current distributed $CO_2$ emissions value determined based on the current location or the location of the most recent battery charge to the update $CO_2$ footprint optimization system at the first client information handling system at block 508. For example, the update $CO_2$ optimization system 250 in an embodiment may store information such as an equivalent $CO_2$ emissions value determined at one or more client information handling systems (e.g., 200) resulting from usage of software applications, or known statistics for GHG emissions due to power consumption in the measured location of a client information handling system (e.g., 200). Upon receipt of the telemetry identifying the location of the first client information handling system 200 in an embodiment, the sustainability engine 281 may retrieve a distributed power $CO_2$ emissions value for the geographic location of the first client information handling system during the current monitoring period. In some embodiments in which the first client information handling system 200 is operating on battery power during some or all of a given monitoring period, the sustainability engine 281 may retrieve a distributed power $CO_2$ emissions value for the geographic location in which the first client information most recently charged the battery.

At block 510, the update $CO_2$ footprint optimization system in an embodiment may determine a current hardware component power consumption rate at the first client information handling system. The current hardware component power consumption rate for a given software application or firmware driver in an embodiment may be determined via a trained deep learning algorithm in an embodiment by determining the power consumed by each hardware component per minute. For example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, or time required to process requests to access such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution).

In another example, the power analytics module 240 in an embodiment may determine current usage of network interface device resources by software applications as a percentage of total capacity for the network interface device 220 to transceive data (e.g., percentage of total available throughput used). In yet another example, the power analytics module 240 in an embodiment may determine current usage of the camera 248 resources by software applications as a percentage of total capacity for the camera 248. In still another example embodiment, the power analytics module 240 may determine policies controlling the periods in which sensing hardware may be operational. More specifically, the power analytics module 240 in an embodiment may determine whether the motion detector 247, or location sensing device (e.g., GPS unit) 249 are set to remain on at all times, to operate only when a laptop or mobile information handling system is in a certain position (e.g., closed or open), to operate when a mobile device is currently moving, or to operate only when a user is actively executing software applications or certain software applications. All information accessed in such a way by the power analytics module 240 in an embodiment may be communicated to the update $CO_2$ footprint optimization system 250. Such information may be gathered and communicated to the update $CO_2$ footprint optimization system 250 in routine monitoring periods. For example, such information gathered during the most recently completed monitoring period may form a recent hardware component power consumption rate in an embodiment.

The update $CO_2$ footprint optimization system at the first client information handling system in an embodiment may determine an execution $CO_2$ emissions comparison index value at block 512. As described herein, the update $CO_2$ footprint optimization system in embodiments may recommend declining the update to the firmware or software application when the estimated power that will be consumed during the update exceeds the estimated decrease in power consumption that the update will afford. In order to make such a determination, the update $CO_2$ footprint optimization system in an embodiment may estimate how much power consumption may be decreased by installing an available update for a firmware or software application. This estimation may be the execution $CO_2$ emissions comparison index value in an embodiment. Such a comparison index value may be made based on the difference between the benchmark measure of power consumed during execution of the firmware or software application and the current power consumption during such execution.

A benchmark measure of power consumed during execution of a software application or firmware driver in an embodiment may be determined based on a benchmark, ideal, or optimal efficiency with which the software application or firmware driver consumes hardware component resources during such execution. The efficiency with which the software application or firmware driver consumed such resources during the training session, shortly after initial installation of the software application or firmware driver may provide a model or benchmark for such an optimal efficiency. For example, the update $CO_2$ footprint optimization system 250 in an embodiment may refer to the benchmark execution hardware component resource consumption percentage while processing, for example, with the deep learning algorithm of the update $CO_2$ footprint optimization system 250. The update $CO_2$ footprint optimization system 250 may multiply this benchmark update execution hardware component resource consumption percentage by the current hardware component power consumption rate determined at block 510 to estimate a rate at which hardware components may consume power (e.g., in Watts/hour) during execution of the software application or firmware driver if the update were installed and the software application or firmware driver consequently regained optimal capabilities for utilization of hardware resources.

In order to estimate the $CO_2$ that may be emitted during such an optimal execution, following installation of an update, the update $CO_2$ footprint optimization system in an embodiment may multiply this estimated rate at which the hardware components may consume power during optimal execution (e.g., as determined directly above) by the distributed power $CO_2$ emissions value (e.g., in pounds $CO_2$ per Watt) for the current geographic location as received at block 508. Multiplying this value by the recent time of use for the software application or firmware driver, which may reflect the amount of time during the most recent monitoring period in which the software application or firmware driver was used may result in a benchmark or ideal measure of $CO_2$ that would be emitted during execution of a software application or firmware driver executing at an ideal or optimal efficiency, which may be caused by an installation process of the update.

In another embodiment, an average measure of power consumed during execution of the software application or firmware driver following installation of the update at other client information handling systems (e.g., 270) in an embodiment may be determined based on an average efficiency with which the software application or firmware driver consumes hardware component resources during such execution, following such an installation. For example, the update $CO_2$ footprint optimization system 250 in an embodiment may refer to the recent average execution hardware component resource consumption percentage. The update $CO_2$ footprint optimization system 250 may multiply this recent average execution hardware component resource consumption percentage by the current hardware component power consumption rate determined at block 510 to estimate a rate at which hardware components may consume power (e.g., in Watts/hour) during execution of the software application or firmware driver if the update were installed.

In order to estimate the $CO_2$ that may be emitted during such an optimal execution, following installation of an update, the update $CO_2$ footprint optimization system in an embodiment may multiply this estimated rate at which the hardware components may consume power during execution following an update (e.g., as determined directly above) by the distributed power $CO_2$ emissions value (e.g., in pounds $CO_2$ per Watt) for the current geographic location as received at block 508. Multiplying this value by the recent time of use for the software application or firmware driver, which may reflect the amount of time during the most recent monitoring period in which the software application or firmware driver was used may result in an average measure of $CO_2$ that may be emitted during execution of a software application or firmware driver executing following installation of the update.

The update $CO_2$ footprint optimization system in an embodiment may compare this average or benchmark measure of power that may be consumed during execution following installation of an update to the current measure of power consumed prior to the update. For example, a recent measure of power consumed during execution of the software application or firmware driver prior to installation of the available update during a recent monitoring period at the client information handling system 250 in an embodiment may be determined based on a recent efficiency with which the software application or firmware driver consumed hardware component resources during such execution. For example, the update $CO_2$ footprint optimization system 250 in an embodiment may refer to the recent execution hardware component resource consumption percentage for the first client information handling system 200 during the most recent monitoring period. The update $CO_2$ footprint optimization system 250 may multiply this recent execution hardware component resource consumption percentage for the first client information handling system 200 by the recent hardware component power consumption rate determined at block 510 to estimate a rate at which hardware components may consume power (e.g., in Watts/hour) during execution of the software application or firmware driver prior to installation of the update.

In order to estimate the $CO_2$ that may be emitted during such an execution, prior to installation of the update, the update $CO_2$ footprint optimization system in an embodiment may multiply this estimated rate at which the hardware components may consume power during execution prior to an update (e.g., as determined directly above) by the distributed power $CO_2$ emissions value (e.g., in pounds $CO_2$ per Watt) for the geographic location of the client information handling system 200 during the most recent monitoring period, as received at block 508. Multiplying this value by the recent time of use for the software application or firmware driver, which may reflect the amount of time during the most recent monitoring period in which the software application or firmware driver was used may result in a recent measure of $CO_2$ that was emitted during execution of a software application or firmware driver executing prior to installation of the update.

The update $CO_2$ footprint optimization system 250 in an embodiment may determine the execution $CO_2$ emissions comparison index value in an embodiment by subtracting the recent measure of $CO_2$ that was emitted during execution of the software application or firmware driver prior to installation of the update from the benchmark or ideal estimate of $CO_2$ that may be emitted during optimally efficient execution of the software application or firmware driver following installation of the update. In another embodiment, the update $CO_2$ footprint optimization system 250 may determine the execution $CO_2$ emissions comparison index value by subtracting the recent measure of $CO_2$ that was emitted during execution of the software application or firmware driver prior to installation of the update from the average measure of $CO_2$ emitted during execution of the software application or firmware driver following installation of the update across a plurality of client information handling systems (e.g., including 270). These differences may describe the $CO_2$ emissions that may be avoided by increasing the efficiency with which the software application or firmware driver consumes hardware component resources due to an installation process of the update.

At block 514, the update $CO_2$ footprint optimization system at the first client information handling system in an embodiment may determine an installation $CO_2$ emissions comparison index value. As described herein, the update $CO_2$ footprint optimization system may estimate how much power will be consumed during the installation process of the update based on the power consumed during previous installation of prior updates to the same firmware or software application, or upon time of installation of the current update at other client information handling systems. In order to make such a determination, the update $CO_2$ footprint optimizations system 250 in an embodiment may first determine a degree to which power consumption at the first client information handling system 200 may increase during such an installation. For example, the update $CO_2$ footprint optimization system 250 in an embodiment may multiply the current hardware component power consumption rate (e.g., as determined at block 510) by the value of one plus the benchmark or average update installation hardware resource consumption percentage.

More specifically, the update $CO_2$ footprint optimization system 250 in an embodiment may multiply the current hardware component power consumption rate (e.g., Watts/hour) by the value of one (representing current hardware component power consumption rate, prior to installation of the update) plus the benchmark update installation hardware resource consumption percentage (representing the increase in hardware component power consumption rate that would be caused by installing the update). In another embodiment, the update $CO_2$ footprint optimization system 250 may multiply the current hardware component power consumption rate (e.g., Watts/hour) by the value of one (representing current hardware component power consumption rate, prior to installation of the update) plus the average recent installation hardware resource consumption percentage received at block 504 (representing the increase in hardware component power consumption rate that would be caused by installing the update). This may provide an estimated installation hardware component power consumption rate describing the rate at which power may be consumed during the installation process of the available update at the first client information handling system 200.

In order to estimate the $CO_2$ that may be emitted during such an installation process of the update, the update $CO_2$ footprint optimization system in an embodiment may multiply this estimated installation hardware power consumption rate (e.g., as determined directly above) by the distributed power $CO_2$ emissions value (e.g., in pounds $CO_2$ per Watt) for the current geographic location, as received at block 508. Multiplying this value by the benchmark or average installation time value for the software application or firmware driver may provide the installation $CO_2$ emissions comparison index value in an embodiment. For example, the update $CO_2$ footprint optimization system in an embodiment may multiply this estimated installation hardware power consumption rate (e.g., as determined directly above) by the distributed power $CO_2$ emissions value for the current geographic location and the benchmark update installation time value indicating time required to install a previous update to the same software application or firmware driver at the first client information handling system 200 during the training period. In another example embodiment, the update $CO_2$ footprint optimization system in an embodiment may multiply this estimated installation hardware power consumption rate (e.g., as determined directly above) by the distributed power $CO_2$ emissions value for the current geographic location and the average recent update installation time value indicating time required to install the same update at other client information handling systems (e.g., 270). In such a way, the update $CO_2$ footprint optimization system 250 may estimate $CO_2$ that may be emitted during the installation process of the currently available update at the first client information handling system 200. The update $CO_2$ footprint optimization system 250 in an embodiment may then proceed to FIG. 5B.

Turning to FIG. 5B, at block 516, the update $CO_2$ footprint optimization system at the first client information handling system in an embodiment may determine whether the installation power consumption comparison index value is greater than the execution power consumption comparison index value. As described herein, the update $CO_2$ footprint optimization system may compare a measure of $CO_2$ emissions that installation of an available update will cause with a measure of $CO_2$ emissions that will be avoided due to increased efficiency of the software application or firmware driver resulting from such an installation. If the installation $CO_2$ emissions comparison index value is higher than the execution $CO_2$ emissions comparison index value, this may indicate that the installation process may generate more $CO_2$ emissions than it will avoid through more efficient execution of the software application or firmware driver, and the method may proceed to block 518 for recommending delay or cancelling of installation. If the execution $CO_2$ emissions comparison index value is higher than the installation $CO_2$ emissions comparison index value, this may indicate that the installation may generate less $CO_2$ emissions than it will avoid through more efficient execution of the software application or firmware driver, and the method may proceed to block 532 for recommending installation.

In an embodiment in which the installation $CO_2$ emissions comparison index value is higher than the execution $CO_2$ emissions comparison index value, the update $CO_2$ footprint optimization system at block 518 may recommend delaying the available update installation until prompted to proceed with such an available update, via a GUI. This may include generating a notice to a user or an IT manager via a GUI that one or more updates should be delayed and presenting a selection softkey to agree with delaying or dismiss the recommendation and proceed with the update.

At block 520, the update $CO_2$ footprint optimization system in an embodiment may determine whether the recent time of use for the software application or firmware driver is below a required time of use threshold value. As described herein, some updates may increase the efficiency of hardware (e.g., through firmware or driver updates), or may increase the efficiency with which software applications consume hardware component resources (e.g., make calls to the CPU, store data in memory). These updates may significantly decrease an overall power consumption and resulting carbon footprint for a client information handling system, especially if the firmware or software application to be updated is routinely executed by the user. However, in other cases, such firmware or software application to be updated may be executed rarely or never. If the recent time of use for the software application or firmware driver is below a preset time of use threshold value (e.g., 10% of the most recent monitoring period), this may indicate that the installation $CO_2$ emissions comparison index value is higher than the execution $CO_2$ emissions comparison index value because the software application or firmware driver is being underutilized. More specifically, this may indicate that an increase in efficiency of the software application may not provide a substantial difference in power consumption and $CO_2$ emissions associated with the execution of the software application or firmware driver, because the software application or firmware driver is rarely used. If the recent time of use is below the preset time of use threshold value, the method may proceed to block 522 to determine whether the software application or firmware driver has ever been used. If the recent time of use is at or above the preset time of use threshold value, this may indicate that there is another cause for the installation $CO_2$ emissions comparison index value exceeding the execution $CO_2$ emissions comparison index value, and the method may proceed to block 528 to determine such a cause.

The update $CO_2$ footprint optimization system at the first client information handling system in an embodiment in which the recent time of use is below the preset time of use threshold value may determine whether the software application or firmware driver have ever been used at block 522. As described herein, for any given monitoring period, the user may have used the software application or firmware driver for which an update is available for too short a period to justify installation of an update for that application or driver. However, because usage of various applications and drivers may vary across a plurality of monitoring periods, it may become appropriate or justified to install such an update or future updates if the user increases usage of the application or driver in the future. In contrast, if a user has never used an application or driver, it may be more appropriate to delete the application or firmware and all associated files. If the user has never executed the application or driver, the method may proceed to block 526 for such a recommendation for uninstallation of the application or driver and deletion of all associated files. If the user has executed the application or driver in the past, but the usage of that application or driver falls below the time of use threshold value described at block 520 during the most recent monitoring period, the method may proceed to block 524 for reevaluation of the benefit of installing the currently available or future updates during future monitoring periods.

At block 524, in an embodiment in which the user has executed the application or driver in the past, but the usage of that application or driver falls below the time of use threshold value described at block 520 during the most recent monitoring period, the update $CO_2$ footprint optimization system may reevaluate the installation $CO_2$ emissions comparison index value and execution $CO_2$ emissions comparison index value during the next monitoring period. As described herein, usage of various applications and drivers may vary across a plurality of monitoring periods as well as changes to power consumption levels at the client information handling system.

As a consequence, it may become appropriate or justified to install such an update or future updates if the user increases usage of the software application or firmware driver or power consumption conditions favorably change in the next monitoring period. Such a reevaluation of the installation $CO_2$ emissions comparison index value and the execution $CO_2$ emissions comparison index value may involve repeating the method described above with respect to blocks 502-514 for determination of the installation $CO_2$ emissions comparison index value and the execution $CO_2$ emissions comparison index value during a future monitoring period, which may occur at a different geographic location than the current geographic location or the most recent geographic location measured during the recent monitoring period. The method may then proceed back to block 516 to determine whether the installation $CO_2$ emissions comparison index value still exceeds the execution $CO_2$ emissions comparison index value. The time of use of the software application or firmware driver may change markedly between such monitoring periods, and the measure of $CO_2$ emitted per Watt of power consumed may also vary (e.g., based on changes in geographic location between monitoring periods).

Thus, it is feasible that installation of an available update may cause more $CO_2$ emissions during the installation process than such an installation would conserve (e.g., through an increase in efficiency) during a first monitoring period, but for the reverse to be true during an immediately following monitoring period or a later monitoring period. In other words, the installation of such an available update may conserve more $CO_2$ emissions (e.g., through increased efficiency) than it would cause if it were installed one day, one week, or one month later than the date on which the update initially became available. By repeating the loop between block 524 and 516, the update $CO_2$ footprint optimization system in an embodiment may adaptively adjust to changing circumstances at the first client information handling system to continuously ensure updates are installed only when the installation process of such an available update may conserve more $CO_2$ emissions (e.g., through increased efficiency) than it would cause.

In an embodiment in which the user has never executed the application or driver, the update $CO_2$ footprint optimization system at block 526 may recommend deletion of the software application or firmware driver and associated files. As described herein, an installation process of an available update may consume hardware component resources, and thus, by itself, increases power consumption and carbon footprint for the client information handling system. This may be justified when such an update may significantly decrease an overall power consumption and resulting carbon footprint for a client information handling system. However, such a decrease in $CO_2$ emissions may not be realized if such firmware or software application to be updated is executed rarely or never. In such a case, the update $CO_2$ footprint optimization system in an embodiment may determine that the best way to optimize $CO_2$ emissions associated with the software application or firmware driver is to uninstall it. This may end any analysis of future available updates, thus conserving processing resources and future power consumption due to such consideration. Deletion of related files may decrease unnecessary consumption of memory and processing resources and avoid any potential auto-execution of any of these files, which may complicate or interfere with proper and efficient functioning of other software application and firmware drivers. In such a way, the update $CO_2$ footprint optimization system may minimize $CO_2$ emissions due to maintenance of an unused software application or firmware driver in an embodiment. The method for recommending cancellation of an update installation based on a comparison between carbon dioxide ($CO_2$) estimated to be emitted during the installation process and $CO_2$ estimated to be conserved as a consequence of the installation may then end.

At block 528, in an embodiment in which the recent time of use is at or above the preset time of use threshold value, the update $CO_2$ footprint optimization system may determine whether the current distributed power $CO_2$ emissions value has changed by more than a location-based threshold value. As described herein, if the recent time of use is at or above the preset time of use threshold value, this may indicate that there is cause for the installation $CO_2$ emissions comparison index value to exceed the execution $CO_2$ emissions comparison index value other than the time of use of the software application or firmware driver. Another variable that may impact such comparison index values may be the distributed power $CO_2$ emissions values determined during at the current location and determined during the most recent monitoring period based on the location of the first client information handling system during that monitoring period. The distributed power $CO_2$ emissions value may describe a measure of $CO_2$ (e.g., in pounds) emitted during the generation of each Watt or kilowatt (kW) of power at the power plant supplying power to devices within the geographic location of the first client information handling system. In an embodiment in which the first client information handling system is currently operating on A/C power supplied by a wall outlet, for example, the current distributed power $CO_2$ emissions value may be specific to the current geographic location for the first client information handling system. In an embodiment in which the first client information handling system is currently operating on battery power, the current distributed power $CO_2$ emissions value may be specific to the geographic location measured for the first client information handling system at the time of most recent battery charging.

This current distributed power $CO_2$ emissions value may differ widely between various geographic locations based on the types of power generation used to produce such power. For example, some power plants use clean power sources such as hydro-electric power, wind power, or solar power. Other power plants may generate power primarily through the burning of fossil fuels (e.g., liquid natural gas, petroleum, coal), which may be associated with much higher $CO_2$ emissions than cleaner power sources. Thus, a change in geographic location between monitoring periods in an embodiment may cause a significant change in both the installation $CO_2$ emissions comparison index value and the execution $CO_2$ emissions comparison index value.

In an embodiment, if the distributed power $CO_2$ emissions value at the current location differs from the distributed power $CO_2$ emissions value determined for the most recent monitoring period by a location-based threshold value (e.g., 10%, 15%, 25%, 50%, etc.), this may indicate that the change in location between the current time and the most recent monitoring period is driving the installation $CO_2$ emissions comparison index value to exceed the execution $CO_2$ emissions comparison index value. This may indicate that installation of the update at the current time may cause an increase in $CO_2$ emissions due to the installation process that may not be offset by increased efficiency due to such an installation. However, this may not be the case in the future, if the first client information handling system moves to another geographic location associated with a different distributed power $CO_2$ emissions value. If the distributed power $CO_2$ emissions value at the current location differs from the distributed power $CO_2$ emissions value determined for the most recent monitoring period by a location-based threshold value, the method may proceed to block 530 for reevaluation of the comparison index values when the location of the client information handling system changes or upon next charging of the battery. If the distributed power $CO_2$ emissions value at the current location does not differ from the distributed power $CO_2$ emissions value determined for the most recent monitoring period by a location-based threshold value, the method may proceed back to blocks 524 and 516 for reevaluation of the comparison index values during the next monitoring period in which multiple variables for the comparison index values may change. By repeating the loop between block 524 and 516, the update $CO_2$ footprint optimization system in an embodiment may adaptively adjust to changing circumstances at the first client information handling system to continuously ensure updates are installed only when the installation of such an available update may conserve more $CO_2$ emissions (e.g., through increased efficiency) than it would cause.

The update $CO_2$ footprint optimization system in an embodiment may reevaluate the comparison index values at block 530 upon a change in distributed power $CO_2$ emissions value or upon the next battery charge. As described herein, in an embodiment in which the first client information handling system is currently operating on A/C power supplied by a wall outlet, for example, the current distributed power $CO_2$ emissions value may be specific to the current geographic location for the first client information handling system. In such an embodiment, the update $CO_2$ footprint optimization system may proceed back to block 516 for reevaluation of the comparison index values upon a future determination that the first client information handling system has changed locations from the current geographic location. By repeating the loop between block 530 and 516, the update $CO_2$ footprint optimization system in an embodiment may adaptively adjust to changing circumstances at the first client information handling system to continuously ensure updates are installed only when the installation of such an available update may conserve more $CO_2$ emissions (e.g., through increased efficiency) than it would cause.

In an embodiment in which the first client information handling system is currently operating on battery power, the current distributed power $CO_2$ emissions value may be specific to the geographic location measured for the first client information handling system at the time of most recent battery charging. In such an embodiment, the update $CO_2$ footprint optimization system may proceed back to block 516 for reevaluation of the comparison index values upon a future determination that the battery is being recharged. By repeating the loop between block 530 and 516, the update $CO_2$ footprint optimization system in an embodiment may adaptively adjust to changing circumstances at the first client information handling system to continuously ensure updates are installed only when the installation process of such an available update may conserve more $CO_2$ emissions (e.g., through increased efficiency) than it would cause.

At block 532, in an embodiment in which the execution $CO_2$ emissions comparison index value is higher than the installation $CO_2$ emissions comparison index value, this may indicate that installation of the update may result in an overall decrease in $CO_2$ emissions by increasing efficiency of the software application or firmware driver. In such an embodiment, the update $CO_2$ footprint optimization system may recommend installation of the update via a GUI, or may not interfere with an auto-update process for the available update. In such a way, the update $CO_2$ footprint optimization system may optimize the update process for various firmware or software applications based on actual usage and power consumption statistics to decrease the carbon footprint caused by updating and execution of those firmware or software applications.

The blocks of the flow diagrams of FIGS. 3, 4, 5A, and 5B, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An update carbon dioxide ($CO_2$) footprint optimization system operating on a first client information handling system comprising:

a processor executing update $CO_2$ footprint optimization system code instructions to:

gather recent telemetry describing power consumption and usage of hardware component resources during a recent execution of a software application over a recent monitoring period at a recent geographic location, and current telemetry during a current execution of the software application at a current geographic location;

determine an execution $CO_2$ emissions comparison index value describing a difference between $CO_2$ emitted due to the recent execution or current execution of the software application relative to $CO_2$ emitted due to an execution of the software application at an optimal efficiency observed during a testing period or due to modelled, expected performance of the software application after installation of an available update;

determine an installation $CO_2$ emissions comparison index value describing an estimated $CO_2$ emissions value associated with an installation process of the available update at the current geographic location, based on a benchmark update installation time value;

a graphical user interface (GUI) displaying on a display device a first recommendation to a user of the first client information handling system to delay installation of the available update if the installation $CO_2$ emissions comparison index value exceeds the execution $CO_2$ emissions comparison index value, indicating installation of the available update will result in emission of more $CO_2$ than it will conserve; and the processor proceeding with the installation of the available update at the first client information handling system when the installation $CO_2$ emissions comparison index value is below the execution $CO_2$ emissions comparison index value indicating that the installation process of the available update will conserve emission of $CO_2$.

2. The update $CO_2$ footprint optimization system of claim 1 further comprising:

a graphical user interface (GUD) displaying on the display device a second recommendation to the user of the first client information handling system to delay installation of the available update until the first client information handling system is in a new geographic location associated with a second estimated $CO_2$ emissions value associated with an installation process of the available update that is lower than the estimated $CO_2$ emissions value associated with the installation process of the available update; and the processor proceeding with the installation of the available update when the first client information handling system is detected in the new geographic location associated with the second estimated $CO_2$ emissions value associated with an installation process of the available updated.

3. The update $CO_2$ footprint optimization system of claim 1 further comprising:

the processor to determine the execution $CO_2$ emissions comparison index value based on a recent time of use of the software application.

4. The update $CO_2$ footprint optimization system of claim 1 further comprising:

the processor to determine the installation $CO_2$ emissions comparison index value based on a measure of hardware resources consumed during a previous installation of a previous update for the software application at the first client information handling system during the training period.

5. The update $CO_2$ footprint optimization system of claim 1 further comprising:

the processor to determine the installation $CO_2$ emissions comparison index value based on a measure of hardware resources consumed during a previous installation of the available update for the software application at a second client information handling system.

6. The update $CO_2$ footprint optimization system of claim 1, wherein the benchmark installation time value is determined based on a previous installation of a previous update for the software application at the first client information handling system during the training period.

7. The update $CO_2$ footprint optimization system of claim 1, wherein the benchmark installation time value is determined based on a previous installation of the available update for the software application at a second client information handling system.

8. The update $CO_2$ footprint optimization system of claim 1 further comprising:

the processor to determine that the software application has not been executed during the recent monitoring period; and the GUI displaying a second recommendation to the user to uninstall the software application and delete associated files.

9. A method of optimizing carbon dioxide ($CO_2$) footprint caused by firmware or software updates at a first client information handling system comprising:

gathering, via a processor executing code instructions, recent telemetry describing power consumption and usage of hardware component resources during a recent execution of a firmware driver over a recent monitoring period at a recent geographic location, and current telemetry during a current execution of the firmware driver at a current geographic location;

determining, via the processor executing code instructions, an execution $CO_2$ emissions comparison index value describing a difference between $CO_2$ emitted due to the recent or current execution of the firmware driver relative to the $CO_2$ emitted due to an execution of the software application at an optimal efficiency observed during a testing period or due to a modelled, expected performance of the firmware driver after installation of an available update;

determining, via the processor executing code instructions, an installation $CO_2$ emissions comparison index value describing an estimated $CO_2$ emissions value associated with an installation process of the available update at the current geographic location, based on a benchmark update installation time value; and displaying, via a graphical user interface (GUI) on a display device, a first recommendation to a user of the first client information handling system to delay installation of the available update if the installation $CO_2$ emissions comparison index value exceeds the execution $CO_2$ emissions comparison index value, indicating installation of the available update will result in emission of more $CO_2$ than it will conserve; and proceeding with the installation of the available update at the first client information handling system, via the processor, when the installation $CO_2$ emissions comparison index value is below the execution $CO_2$ emissions comparison index value indicating that the installation process of the available update will conserve emission of $CO_2$.

10. The method of claim 9 further comprising:

determining that a time of use value for execution of the firmware driver during the recent monitoring period is below a time of use threshold value; and reevaluating, during a future monitoring period occurring at a future geographic location, a comparison between a future execution CO2 emissions comparison index value and a future installation CO2 emissions comparison index value.

11. The method of claim 9 further comprising:

determining that a recent distributed power CO2 emissions value describing CO2 emitted per Watt generated at the recent geographic location differs from a current distributed power CO2 emissions value for the current geographic location by a location-based threshold value; and reevaluating a comparison between a future execution CO2 emissions comparison index value and a future installation CO2 emissions comparison index value during a future monitoring period occurring at a future geographic location.

12. The method of claim 9 further comprising:

the processor to determine the execution CO2 emissions comparison index value based on a recent usage of hardware component resources during the recent execution of the firmware driver.

13. The method of claim 9 further comprising:

the processor to determine the execution CO2 emissions comparison index value based on a current usage of hardware component resources during the current execution of the firmware driver.

14. The method of claim 9 further comprising:

the processor to determine the installation CO2 emissions comparison index value based on a current distributed power CO2 emissions value describing CO2 emitted per Watt generated at the current geographic location.

15. An update carbon dioxide (CO2) footprint optimization system operating on a first client information handling system comprising:

a processor executing update CO2 footprint optimization system code instructions to:

gather recent telemetry describing power consumption and usage of hardware component resources during a recent execution of a software application over a recent monitoring period at a recent geographic location, and current telemetry during a current execution of the software application at a current geographic location;

determine an execution CO2 emissions comparison index value describing a difference between CO2 emitted due to the recent execution or a current execution of the software application relative to CO2 emitted due to an execution of the software application at an optimal efficiency observed during a testing period or due to a modelled, expected performance of the software application after installation of an available update;

determine an installation CO2 emissions comparison index value describing an estimated CO2 emissions value associated with an installation process of the available update at the current geographic location, based on a benchmark update installation time value;

determine a recent distributed power CO2 emissions value describing CO2 emitted per Watt generated at the recent geographic location differs from a current distributed power CO2 emissions value for the current geographic location by a location-based threshold value; and a graphical user interface (GUI) displaying on a display device a first recommendation to a user of the first client information handling system to delay installation of the available update until the first client information handling system is in a new geographic location associated with a new distributed power CO2 emissions value; and the processor proceeding with the installation of the available update when the first client information handling system is detected in the new geographic location associated with the new distributed power CO2 emissions value.

16. The update CO2 footprint optimization system of claim 15 further comprising:

the processor proceeding with the installation of the available update at the first client information handling system when the installation CO2 emissions comparison index value is below the execution CO2 emissions comparison index value indicating that the installation process of the available update will conserve emission of CO2 at the current location.

17. The update CO2 footprint optimization system of claim 15 further comprising:

the GUI displaying on the display device a second recommendation to the user of the first client information handling system to delay installation of the available update if the installation CO2 emissions comparison index value exceeds the execution CO2 emissions comparison index value, indicating installation of the available update will result in emission of more CO2 than it will conserve.

18. The update CO2 footprint optimization system of claim 15 further comprising:

the processor to determine the execution CO2 emissions comparison index value based on a recent power consumption rate during the recent execution of the software application.

19. The update CO2 footprint optimization system of claim 15 further comprising:

the processor to determine the execution CO2 emissions comparison index value based on a recent execution usage level of the software application.

20. The update CO2 footprint optimization system of claim 15 further comprising:

the processor to determine the available update is not critical to functionality of the software application.

* * * * *